(12) United States Patent
Rugina et al.

(10) Patent No.: US 10,120,738 B2
(45) Date of Patent: Nov. 6, 2018

(54) HYPERVISOR TECHNIQUES FOR PERFORMING NON-FAULTING READS IN VIRTUAL MACHINES

(71) Applicant: VMware, Inc., Palo Alto, CA (US)

(72) Inventors: Radu Rugina, Sunnyvale, CA (US); Jeffrey W. Sheldon, Mountain View, CA (US); James S. Mattson, Jr., Seattle, WA (US); David Dunn, Sammamish, WA (US)

(73) Assignee: VMware, Inc., Palo Alto, CA (US)

( * ) Notice: Subject to any disclaimer, the term of this patent is extended or adjusted under 35 U.S.C. 154(b) by 81 days.

(21) Appl. No.: 15/192,642

(22) Filed: Jun. 24, 2016

(65) Prior Publication Data

US 2017/0371733 A1 Dec. 28, 2017

(51) Int. Cl.
| | |
|---|---|
| *G06F 11/00* | (2006.01) |
| *G06F 11/07* | (2006.01) |
| *G06F 3/06* | (2006.01) |
| *G06F 21/52* | (2013.01) |
| *G06F 9/455* | (2018.01) |

(52) U.S. Cl.
CPC ........ *G06F 11/0712* (2013.01); *G06F 3/0622* (2013.01); *G06F 3/0659* (2013.01); *G06F 3/0664* (2013.01); *G06F 3/0673* (2013.01); *G06F 9/45558* (2013.01); *G06F 11/073* (2013.01); *G06F 11/0751* (2013.01); *G06F 11/0793* (2013.01); *G06F 21/52* (2013.01); *G06F 2009/45587* (2013.01); *G06F 2009/45591* (2013.01)

(58) Field of Classification Search
CPC ............ G06F 11/0712; G06F 9/45558; G06F 11/0751
See application file for complete search history.

(56) References Cited

U.S. PATENT DOCUMENTS

| | | | | |
|---|---|---|---|---|
| 7,596,654 | B1 * | 9/2009 | Wong | G06F 12/0813 703/21 |
| 8,578,080 | B2 * | 11/2013 | Sahita | G06F 13/24 710/260 |
| 9,129,106 | B2 * | 9/2015 | Sharif | G06F 21/50 |
| 9,195,518 | B1 | 11/2015 | Larsen et al. | |
| 9,292,328 | B2 * | 3/2016 | Pratt | G06F 9/45545 |
| 9,384,142 | B2 * | 7/2016 | Pease | G06F 12/0891 |
| 9,405,570 | B2 * | 8/2016 | Sahita | G06F 9/45558 |
| 9,846,610 | B2 * | 12/2017 | Tsirkin | G06F 9/45558 |

(Continued)

*Primary Examiner* — Bryce P Bonzo
*Assistant Examiner* — Jonathan D Gibson
(74) *Attorney, Agent, or Firm* — Patterson & Sheridan LLP

(57) ABSTRACT

Guest memory data structures are read by one or more read operations which are set up to handle page faults and general protection faults generated during the read in various ways. If such a fault occurs while performing the one or more read operations, the fault is handled and the one or more read operation is terminated. The fault is handled by either dropping the fault and reporting an error instead of the fault, by dropping the fault and invoking an error handler that is set up prior to performing the read operations, or by forwarding the fault to a fault handler that is setup prior to performing the read operations. If no fault occurs, the read operations complete successfully. Thus, under normal circumstances, no fault is incurred in a read operation on guest memory data structures.

20 Claims, 18 Drawing Sheets

(56) References Cited

U.S. PATENT DOCUMENTS

| | | | |
|---|---|---|---|
| 2009/0037936 A1* | 2/2009 | Serebrin | G06F 12/0292 |
| | | | 719/318 |
| 2009/0217098 A1* | 8/2009 | Farrell | G06F 11/0712 |
| | | | 714/37 |
| 2010/0299665 A1* | 11/2010 | Adams | G06F 9/45533 |
| | | | 718/1 |
| 2011/0047543 A1* | 2/2011 | Mohinder | G06F 12/145 |
| | | | 718/1 |
| 2016/0147993 A1 | 5/2016 | Xu et al. | |
| 2017/0228271 A1* | 8/2017 | Tsirkin | G06F 9/45558 |
| 2017/0371733 A1* | 12/2017 | Rugina | G06F 11/0712 |

\* cited by examiner

HYPERVISOR TECHNIQUES FOR PERFORMING NON-FAULTING READS IN VIRTUAL MACHINES

BACKGROUND

Virtual machine (VM) systems provide a guest operating system (OS) with a virtual execution platform comprising virtual hardware subsystems configured to emulate corresponding physical hardware subsystems. An instance of the virtual execution platform configured to execute the guest OS is commonly referred to as a virtual machine (VM). In a typical VM system, an arbitrary number of VMs may execute on a single physical host machine (or more simply, "host"). Each VM may operate independently with respect to other VMs and may communicate with the other VMs, for example via an emulated network interface. The host, through a virtualization software (e.g., hypervisor) running therein, should be configured with adequate computational and memory resources to support the VMs.

As in physical machines, security measures are implemented in VMs to combat malicious activity, such as corrupting memory or accessing privileged information. VM integrity tools, implemented in VMs as guest drivers, may be used to inspect the contents of the VM in real-time. These tools, as described in U.S. application Ser. Nos. 13/430,868 and 14/550,881, both of which are incorporated by reference herein, monitor events within the VM, and selectively report system events to various service appliances, such as a security service appliance configured with anti-virus and anti-malware scanning software.

As such, guest integrity drivers are key components in the VM's security framework and need to be shielded from kernel-level attacks or malicious programs, such as root kits. The possible root kit attack vectors include attempts to unload the driver or prevent the driver from loading, tampering with the driver code or data that are on disk or in memory, and tampering with the communication channel of the driver.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

According to one or more embodiments, mechanisms to protect a special driver, herein after referred to as a guest integrity ("GI") driver, executing in a virtual machine are provided. The GI driver performs certain operations for protecting the integrity of the virtual machine—also referred to as a "guest." More specifically, the GI driver is implemented in the guest to define memory pages of the VM to be protected. Such protection involves the GI driver requesting that a hypervisor monitor such pages and also requesting to be notified when such pages are written to. Because of the importance of the GI driver, the integrity of the GI driver should be protected. In order to protect the integrity of the GI driver, the GI driver executes in a privileged mode, termed "integrity mode." Requests for protection of the guest, made from the GI driver to the hypervisor, can only be executed in integrity mode. Integrity mode prevents malicious code from masquerading as the GI driver and interfering with the guest protection mechanisms by, for example, changing the memory pages being monitored by the hypervisor.

Integrity mode can only be entered from a pre-specified "entry point," which, in various embodiments, comprises a specific instruction pointer address or a combination of instruction pointer address and virtual central processing unit (vCPU) identifier. In order for the entry point, itself, to be trusted, the GI driver provides an indication of this entry point early on in the guest operating system boot process. Some operating systems, such as Microsoft Windows, provide a window of time, early in the boot-up process, in which to execute security software. By providing this window early in the boot process, the operating system provides a level of certainty that no malicious software has tampered with the operating system or with the GI driver. Additionally, software executed during this period of time is required to be certified by the operating system developer, thus ensuring that such software is not malicious. Defining the entry point for integrity mode during this early period thus provides some certainty that no malicious software has somehow interfered with the mechanism for entering integrity mode, such as by "hijacking" the mechanism for setting the entry point.

Other techniques for protecting the integrity of the GI driver are also provided herein. For example, the GI driver requests protection of the memory pages storing instructions and data for the GI driver, itself. Thus, the GI driver will receive notifications from the hypervisor if malicious software tampers with either the GI driver code or data. Additional protections are provided below.

Figure 1:
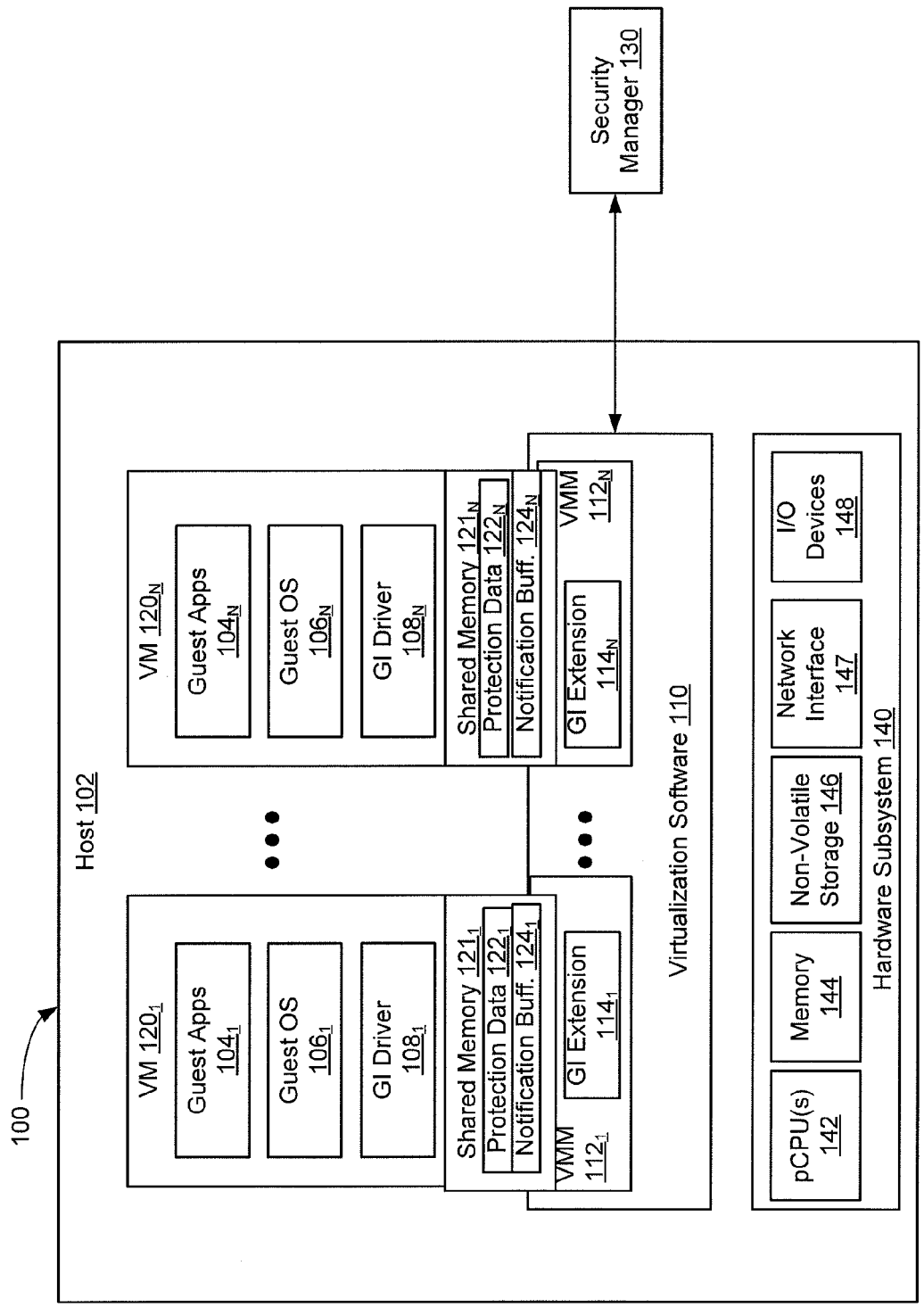
FIG. 1 is a block diagram of a memory protection system, according to embodiments.

FIG. 1 is a block diagram of a host 102 that implements a guest integrity platform according to embodiments. Host 102 includes a hardware computing platform and may be a desktop computer, laptop computer, tablet computer, mobile device such as a smart phone, or server grade computer. The hardware computing platform may be based on different variations of the well-known x86 architecture platforms (or on other available platforms). Host 102 is configured to execute virtualization software 110 that provides execution support for one or more virtualized execution contexts, examples of which include guest virtual machines (VMs) 120.

Each VM 120 may be assigned by virtualization software 110 one or more virtual central processing units ("vCPUs"). VCPUs are virtual versions of physical CPUs and allow VMs 120 to act as multi-CPU machines. Each vCPU is seen as a single physical CPU core by guest OS 106, which can assign different tasks to different vCPUs. Software (e.g., guest apps 104) that is configured to execute on multiple physical CPUs can execute on multiple vCPUs in a virtualized environment.

Each VM 120 executes in an independent context, and virtualization software 110 executes in a more privileged context to support the activities of the VMs 120. Virtualization software 110 may be implemented to include a kernel with hardware drivers for managing hardware subsystem 140 of host 102. In one embodiment, virtualization software 110 comprises a host operating system configured to provide system services to VMs 120. In other embodiments, virtualization software 110 comprises a hypervisor configured to provide system services to VMs 120. The hardware subsystem 140 includes computational resources including one or more processing units (e.g., CPUs 142), system memory 144 (referred to herein as "host physical memory," which is 202 in FIG. 2), mass storage (e.g., non-volatile storage 146), a networking interface 147, and input/output devices 148, which include, for example, keyboard, display, and the like.

As shown, virtualization software 110 includes virtual machine monitors (VMMs) 112, which operate in the privileged context of virtualization software 110 and provide the virtual system support, such as emulated physical devices (e.g., virtual CPUs and virtual system memory), for their respective VMs. In alternative embodiments, there may be one VMM for a plurality of VMs.

Each VM 120 is configured to execute a guest operating system (OS) 106, which may be a commodity operating system, such as Microsoft Windows® operating system or Linux® operating system. Each VM 120 is further configured to support guest applications (apps) 104 and includes a guest integrity (GI) driver 108, described in detail below, which cooperates with virtualization software 110, to provide functionality for defining what memory pages of the VM to protect and detecting writes to the protected pages. Each VM 120 also includes shared memory 121, which stores data for operation of GI driver 108 and GI extension 114. Shared memory 121 is considered to be shared because, although configured as guest memory, shared memory 121 is also accessed by VMM 112.

Protection data 122 includes data that identifies the pages that GI driver 108 has requested GI extension 114 to monitor, and defines what actions to take when each such pages are written to. Such actions are referred to herein as "alert actions." Notification buffer 124 includes notifications from GI extension 114 for notifying guest integrity driver 108 that a violation event, such as a write to a particular protected memory page, has occurred. Notification buffer 124 may be implemented as a ring buffer.

Security manager 130 receives messages from GI extension 114 regarding events (such as writes) related to protected pages. Security manager 130 may be implemented as a virtual machine or as a physical computer system that includes computing components such as a processor, memory, non-volatile storage, networking components, and the like, configured to perform the functionality described herein.

The various terms, layers and categorizations used to describe the virtualization components in FIG. 1 may be referred to differently without departing from their functionality or the spirit or scope of the invention. One example of VMM 112 that may be used is a hypervisor included as a component of VMware's vSphere® product, which is commercially available from VMware, Inc. of Palo Alto, Calif.

Figure 2:
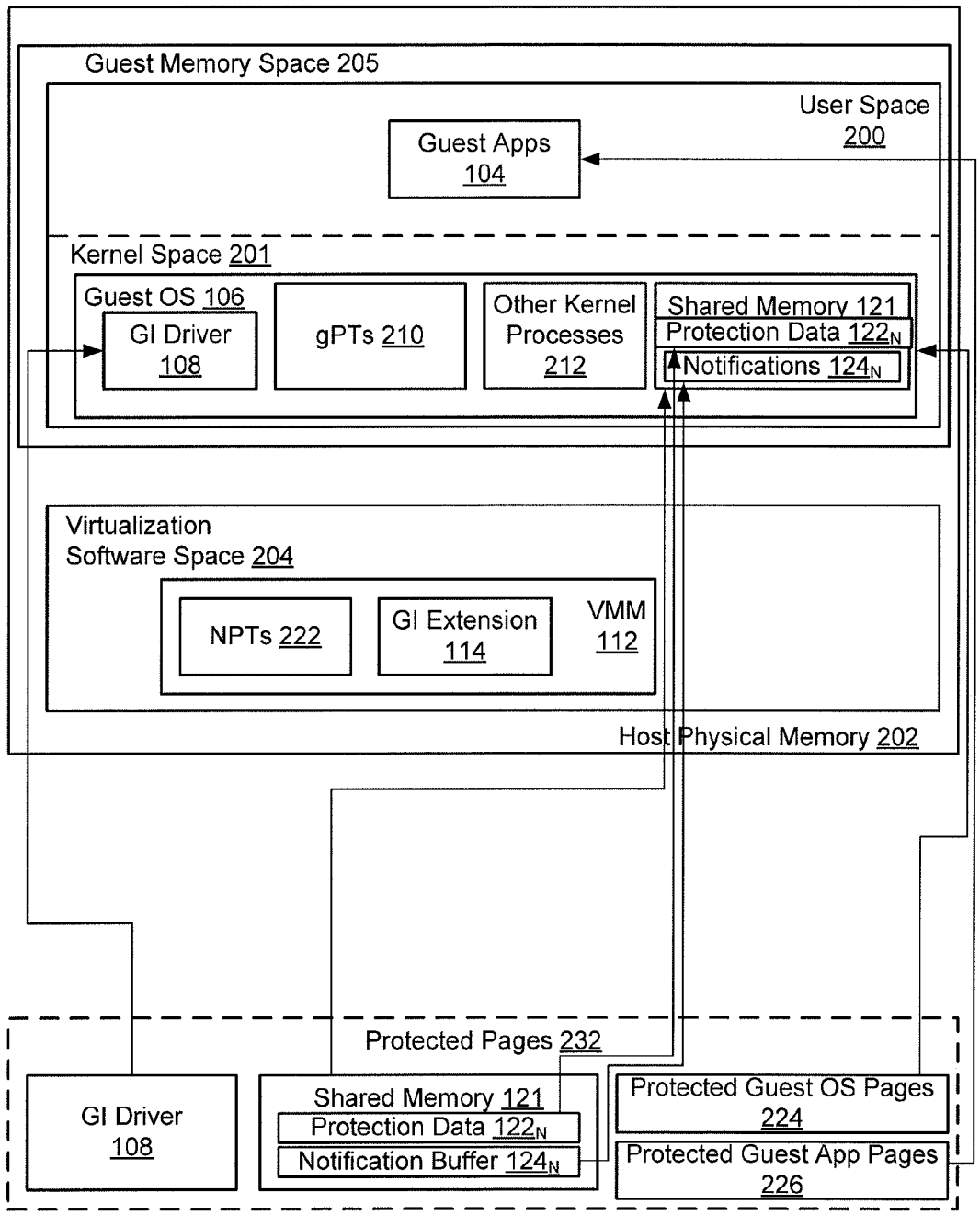
FIG. 2 is a block diagram that illustrates aspects of FIG. 1 in greater detail, according to embodiments.

FIG. 2 is a block diagram that illustrates protected memory pages 232 of a VM that are protected by a GI driver 108 working in cooperation with a GI extension 114, according to embodiments. FIG. 2 also shows the context of those protected memory pages, by illustrating the location of various software modules and data structures associated with operation of the VM and with operation of a virtual machine manager 112 that supports the VM.

Protected memory pages 232 include GI driver 108. Thus, the pages that store the instructions that comprise GI driver 108 are considered to be "protected." These pages are protected so that, in the event malicious code attempts to tamper with the instructions that comprise GI driver 108, GI extension 114 will perform an appropriate alert action. Malicious code may attempt to tamper with GI driver 108 in various ways including modifying GI driver 108 to cause GI driver 108 to request to GI extension 114 that certain memory pages that are protected no longer be protected.

Protected memory pages 232 also include pages of shared memory 121, which include pages that specify protection data 122 and page of the notification buffer 124. Pages of protection data 122 contain information that specifies what memory pages are protected, and "alert information," which define the current set of alert actions. Alert actions are specified in protection data 122 as a selection of zero or more pre-defined actions that may be taken in the event of a violation, such as a write to a protected memory page. In some embodiments, the alert information may specify zero or more of the following actions to be taken in the event of a violation: suspending a VM, sending a message to security manager 130, and writing a notification into notification buffer 124 for consumption by GI driver 108. In some embodiments, the alert information may also specify that the write be blocked. The entries within notification buffer 124 are messages from GI extension 114 to GI driver 108 regarding violations that have occurred.

Protected memory pages 232 also include protected guest OS pages 224 and protected guest app pages 226. Protected guest OS pages 224 comprise certain pages of guest OS 106 for which protection is desired. Protected guest OS pages 224 may include certain "critical" memory pages of guest OS 224 that some entity, such as the developer of GI driver 108, has determined to be critical to the functioning of guest OS 106 and thus in need of protection. Similarly, protected guest app pages 226 comprise pages of guest apps that some entity, such as the developer of GI driver 108 has determined to be critical to the functioning of one or more of the guest apps 104. The specific pages included within protected guest OS pages 224 and protected guest app pages 226 may of course vary by the software configuration of the associated VM.

Protection data 122 may specify any combination of the following alert actions, including none, to take, in response to a protected page being written to: post a notification (also referred to as a "violation event" herein) to notification buffer 124 indicating that the page has been written to, send a predefined message to the security manager 130, and suspend the VM whose page has been written to. In some embodiments, protection data 122 may also specify that the write be blocked. The predefined message that is to be sent to the security manager 130 may be stored in protection data 122.

In order to contrast protected pages 232 with non-protected pages of a VM and VMM 112, various elements, including the elements within protected pages 232, and other, non-protected elements, are shown within host physical memory 202. To provide an understanding of the logical relationship of various elements stored in host physical memory 202, a description of the memory addressing scheme implemented by host computer 102 is now provided.

Host 102 implements second level address translation scheme, which is a scheme whereby the host hardware (e.g., processor and memory management unit ("MMU")) is aware of two levels of page tables that define mappings between guest virtual and guest physical memory as well as mappings between guest physical memory and host physical memory. Guest OS 106 maintains guest virtual-to-guest physical mappings ("gV→gP mappings") within guest page tables ("gPTs") 210. As in physical computer systems, the guest page tables are provided per process in the embodiments. The second type of mappings, labeled as gP→hP mappings, are mappings from the guest physical memory space to the host physical memory space. The gP→hP mapping is managed by VMM 112, and is encoded in nested page tables 222 (NPTs) (also known as "extended page tables"). Conventionally, one set of nested page tables is provided per VM.

Host physical memory 202 is divided into guest memory space 205 and virtualization software space 204. Guest memory space 205 comprises memory assigned to a VM 120 and is divided into user space 200 and kernel space 201. User space 200 comprises memory spaces presented by guest OS 106 to software such as guest apps 104. User space 200 is addressed by guest apps 104 via guest virtual memory addresses. Kernel space 201 comprises memory spaces allocated to guest OS 106 and stores various elements such as GI driver 108, gPTs 210, other kernel processes 212 (that is, kernel processes other than GI driver 108), and protection data 122. Guest apps 104 typically access memory via guest virtual memory addresses, while guest OS 106 has the ability to "see" both guest virtual memory addresses and guest physical memory addresses. Virtualization software space 204 comprises portions of host physical memory 202 that are outside of guest memory space 205 and that are allocated for use by virtualization software 110. VMM 112 has the ability to "see" host physical memory addresses and guest physical memory addresses.

Other portions of host physical memory 202 that are not shown in FIG. 2 may be free or used to map host physical memory required by other VMs or processes running in host 102. It should be recognized that the boxes depicting the various memory spaces and elements are for illustrative purposes only, and that these boxes may be of any size and need not be contiguous in the host physical memory space.

Of the elements in kernel space 201, all of GI driver 108 and all of shared memory 121 are included within protected pages 232. The box labeled "other kernel processes 212" includes all software that comprises guest OS 106 other than GI driver 108 and shared memory 121. Only the portions of guest OS 106 for which protection is explicitly requested by GI driver 108 are protected. Thus, other kernel processes 212 includes some protected memory pages, which are shown as protected guest OS pages 224, and some non-protected memory pages. Guest page tables 210 may include some mappings that are protected. To protect mappings in guest page tables 210, GI driver 108 requests VMM 112 protect particular mappings. VMM 112 stores an indication of protected mappings and at various points in time checks the stored indications against the current mappings to determine whether the mappings have changed. Similarly, some of the memory pages of guest apps 104 are protected. These memory pages are indicated as protected guest app pages 226. Guest apps 104 also include some memory pages that are not protected and thus not included within protected pages 232. Memory within virtualization software space 204 is not accessible to software executing within guest memory space 205, and thus no pages within virtualization software space 204 are protected according to embodiments.

To prevent malicious code from hijacking the mechanism for requesting protection of memory pages, requests to protect memory pages will only be executed by GI extension 114 if executed from an elevated privilege mode referred to herein as "integrity mode." Only GI driver 108 may enter integrity mode. To prevent malicious code from entering integrity mode, GI driver 108 initializes integrity mode by specifying an integrity mode entry point. Integrity mode can only be entered via a specific request that is executed from the pre-specified entry point.

Figure 3:
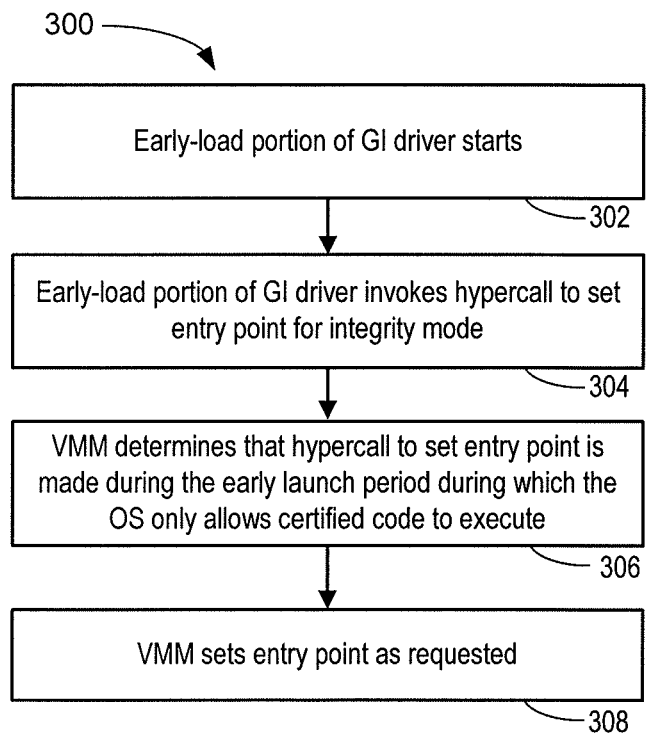
FIG. 3 is a flow diagram of a method for initializing integrity mode for a guest integrity driver, according to an embodiment.

FIG. 3 is a flow diagram of a method 300 for initializing integrity mode for a guest integrity driver, according to an embodiment. Although described with respect to the system of FIGS. 1 and 2, those of skill in the art will recognize that any system that performs the steps of method 300, in various alternative technically feasible orders, falls within the scope of the present disclosure.

As shown, method 300 begins at step 302, where guest OS 106 starts an early-load portion of GI driver 108. The early-load portion of GI driver 108 executes within a time period during the boot process that is specifically provided by guest OS 106 for security purposes. For example, the Microsoft Windows operating system provides an early-launch anti-malware mechanism that loads certain specific drivers at an early time during operating system boot-up. The early time at which such drivers execute provides a level of protection against tampering, because other software, such as malicious code, simply has not yet had an opportunity to execute. Additionally, in some embodiments, the early-load portion of GI driver 108 is pre-certified by the developer of guest OS 106, so that guest OS 106 recognizes the early-load portion of GI driver 108 as "safe" and not including malicious code.

At step 304, the early-load portion of GI driver 108 invokes a hypercall to set an entry point for entering integrity mode. Hypercalls are requests from virtual machines to VMM 112, asking for specific functionality to be performed. At step 306, GI extension 114 in VMM 112 responds to the hypercall invocation and determines that an entry point for entering integrity mode has not yet been set. Although the early-load portion of GI driver 108 is not executing in integrity mode, the early-load portion of GI driver 108 can be trusted because it has been certified and the security assurances guaranteed by OS 106 for code executing during the early-launch period. On the other hand, if GI driver 108 needs to change the entry point for integrity mode at some time after the early-launch period, then GI driver 108 must first enter integrity mode. Integrity mode is required to change the entry point after the entry point has initially been set in order to prevent malicious code from "hijacking" the ability to enter integrity mode by changing the entry point to an address to which the malicious code has access.

At 308, GI extension 114 in VMM 112 sets the entry point for hypercalls to enter integrity mode. The entry point includes an instruction pointer address and may also, in some embodiments, include a specific virtual CPU ("vCPU") identification. Including a vCPU identification in the entry point provides further specificity to the entry point, which provides further assurance that only GI driver 108 is able to enter integrity mode. After this entry point is set, GI extension 114 will ignore hypercalls to enter integrity mode unless such hypercalls are made from the instruction address specified by the entry point as well as the vCPU specified by the entry point in embodiments in which the entry point specifies a particular vCPU.

Figure 4:
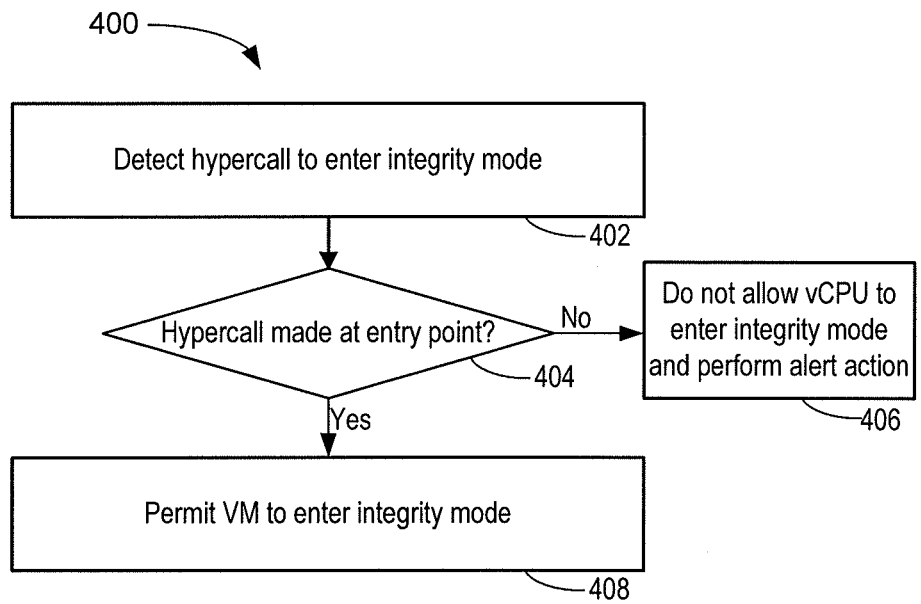
FIG. 4 is a flow diagram of a method for entering integrity mode, according to an embodiment.

With integrity mode initialized and an entry point set, GI driver 108 is able to enter integrity mode by invoking the appropriate hypercall. FIG. 4 is a flow diagram of a method 400 for entering integrity mode, according to an embodiment. Although described with respect to the system of FIGS. 1 and 2, those of skill in the art will recognize that any system that performs the steps of method 400, in various alternative technically feasible orders, falls within the scope of the present disclosure.

As shown, method 400 begins at step 402, where GI extension 114 detects a hypercall to enter integrity mode. This hypercall is intended to be called by GI driver 108 to allow the VM and vCPU on which GI driver 108 is executing to enter integrity mode, and in normal operation, GI driver 108 invokes this hypercall to enter integrity mode so that GI driver 108 can perform other functionality associated with monitoring writes to memory pages. As stated above, only a single entry point exists for entering integrity mode. Because this entry point is assumed to be within GI driver 108, only GI driver 108 is able to enter integrity mode.

At step 404, GI extension 114 detects whether the hypercall to enter integrity mode is made from an already-registered entry point. If the hypercall was made from such an entry point, then method 400 proceeds to step 408 and if the hypercall was not made from such an entry point, then method 400 proceeds to step 406.

At step 406, because the hypercall was not made from an entry point, GI extension 114 does not allow the VM (or vCPU if the entry point specifies a vCPU) from which the hypercall was made to enter integrity mode. Malicious software might attempt to enter integrity mode, and can attempt to execute a hypercall to do so. Determining whether hypercalls to enter integrity mode are made from an entry point allows GI extension 114 to prevent such malicious software from entering integrity mode. At step 406, GI extension 114 also performs the alert action associated with attempting to enter integrity mode from a location other than the pre-specified entry point. The alert action may be defined by a VM executing in integrity mode and invoking the "set up alert table and global alerts" hypercall described below. After step 406, method 400 ends.

At step 408, because the hypercall was made from an entry point, GI extension 114 allows the VM (or vCPU) from which the hypercall was made to enter integrity mode. In some embodiments, GI extension 114 maintains an indication of whether a particular VM or vCPU is currently in integrity mode. This indication may be stored in virtualization software space 204. As described below, in integrity mode, various "protected" hypercalls can be executed for configuring GI extension 114.

Successfully invoking the enter integrity mode hypercall automatically disables interrupts on the vCPU and returns the value of the interrupt flag (IF) prior to disabling interrupts to GI driver 108 so that the previous interrupt state may be restored. After entering integrity mode, GI driver 108 switches stacks and disables thread rescheduling on the vCPU to prevent thread switches while integrity mode is enabled. Disabling interrupts and disabling thread rescheduling prevents guest OS 106 from pre-empting GI driver 108, which could allow another thread to execute in integrity mode. After disabling thread rescheduling, GI driver 108 restores the saved interrupt flag and proceeds with other hypercalls to access guest integrity services from GI extension 114. The enter integrity mode hypercall does not require the VM to be already executing in integrity mode.

A separate hypercall exists for exiting integrity mode. This hypercall must be called from integrity mode. Attempting to invoke the exit integrity mode hypercall from outside of integrity mode will fail and cause GI extension 114 to perform the pre-defined alert action associated with a hypercall that requires integrity mode not being called from within integrity mode. Once this hypercall is invoked, a vCPU that was executing in integrity mode no longer executes in integrity mode and the hypercalls that require execution in integrity mode may no longer be performed until GI driver 108 next enter integrity mode.

Once integrity mode has been entered, GI driver 108 may successfully invoke various "protected" hypercalls for either monitoring writes to specific memory pages or for protecting GI driver 108 itself. These hypercalls are prevented from being executed outside of integrity mode, to prevent malicious code executing within a VM from modifying, impersonating, or otherwise tampering with the functionality provided by GI driver 108. Some examples of such protected hypercalls include a "write-watch hypercall," which requests GI extension 114 to monitor writes to particular memory pages, a "backdoor message hypercall," which requests GI extension 114 to send a message to security manager 130 via a secure "backdoor" channel, a "gPT watch hypercall," which requests GI extension 114 to monitor guest physical to guest virtual mappings within gPTs 210, an "alert define hypercall," which requests GI extension 114 to define alert actions to be performed in the event of certain violation events occurring, and other hypercalls for initializing or configuring GI driver 108 or GI extension 114. These protected hypercalls are discussed in further detail below.

Figure 5:
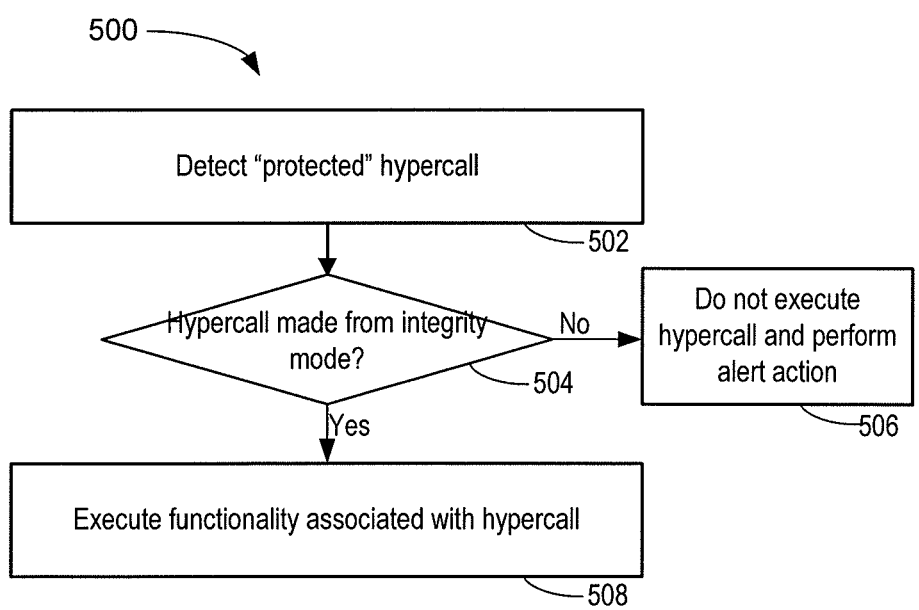
FIG. 5 is a flow diagram of a method for executing protected hypercalls, according to an embodiment.

FIG. 5 is a flow diagram of a method 500 for executing "protected" hypercalls, according to an embodiment. Although described with respect to the system of FIGS. 1 and 2, those of skill in the art will recognize that any system that performs the steps of method 500, in various alternative technically feasible orders, falls within the scope of the present disclosure.

At step 502, GI extension 114 detects invocation of a protected hypercall. As described above, a wide variety of protected hypercalls may be invoked by GI driver 108 while executing in integrity mode. These protected hypercalls provide functionality generally associated with requesting that GI extension 114 monitor memory pages of a VM. These hypercalls are "protected" in the sense that the hypercalls cannot be executed outside of integrity mode.

At step 504, GI extension 114 detects whether the VM or vCPU that invoked the protected hypercall at step 502 is executing in integrity mode. If the VM or vCPU is executing in integrity mode, then method 500 proceeds to step 508 and if the VM or vCPU is not executing in integrity mode, then method 500 proceeds to step 506.

At step 506, GI extension 114 does not execute the hypercall and performs an alert action, such as sending a message to security manager, informing GI driver 108 that a protected hypercall attempted to be executed outside of integrity mode, or suspending the VM from which the protected hypercall was invoked. The alert action to be performed may be a global alert action, defined by a hypercall for defining alerts, described below. Because the hypercall was not made from integrity mode, GI extension 114 determines that executing the hypercall would not be "safe," since that hypercall may have been invoked by malicious code. After step 506, method 500 ends.

If, at step 504, the VM or vCPU that invoked the hypercall was executing in integrity mode, then method 500 proceeds to step 508 instead of step 506. At step 508, GI extension 114 executes the hypercall because the hypercall is invoked from within integrity mode. GI extension 114 deems that execution of this protected hypercall is "safe," because only GI driver 108, and not malicious software, is able to enter integrity mode.

As described above, one of the types of hypercalls that is protected by the integrity mode mechanism is a hypercall to request that GI extension 114 start or stop monitoring writes to specific memory pages. This hypercall is protected so that malicious code cannot change which memory pages are monitored by GI extension 114.

Figure 6:
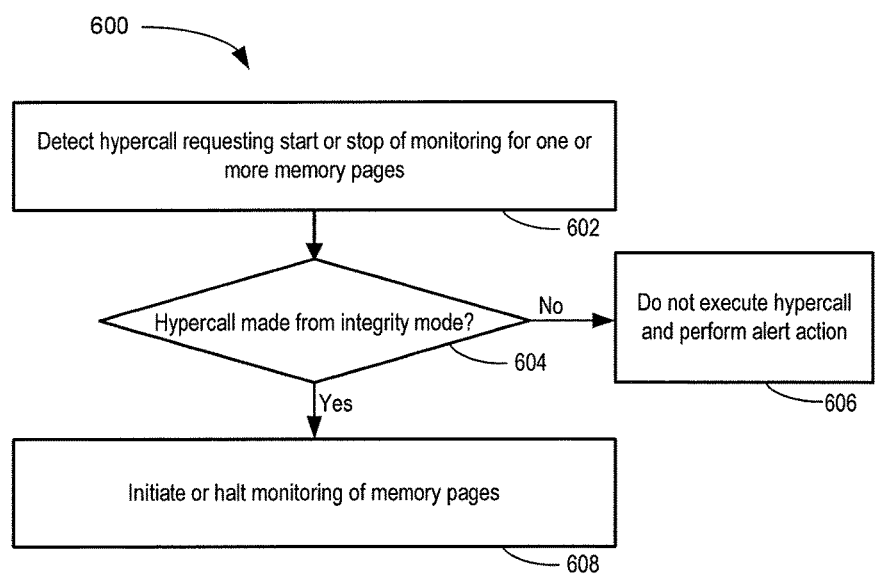
FIG. 6 is a flow diagram of a method for executing a hypercall to initiate or halt monitoring of memory pages, according to an embodiment.

FIG. 6 is a flow diagram of a method 600 for executing a hypercall to initiate or halt monitoring of memory pages, according to an embodiment. Although described with respect to the system of FIGS. 1 and 2, those of skill in the art will recognize that any system that performs the steps of method 600, in various alternative technically feasible orders, falls within the scope of the present disclosure.

GI driver 108 performs method 600 to monitor memory pages specific to GI driver 108 itself, including the pages that store GI driver 108 itself, and the pages that store protection data 122. Protecting these pages allows specified alert actions to be performed if malicious code tampers with GI driver 108 itself. GI driver 108 also performs method 600 to protect other pages, such as pages that store some of guest OS 106 and/or guest apps 104.

At step 602, GI extension 114 detects a hypercall requesting write monitoring for one or more memory pages of a VM 120. This hypercall may be referred to as a "write-watch hypercall" herein. A write-watch hypercall may request such monitoring to either begin or to end. In some embodiments, a write-watch hypercall specifies pages to watch, or to stop watching, by guest physical page number. The write-watch hypercall also specifies particular actions (also referred to as "alerts") to take upon detecting a write to a monitored page. In some embodiments, these actions are specified on a per-guest-physical-page basis. Thus, different alert actions can be specified for different guest physical pages. In some embodiments, instead of a write-watch hypercall, a read-watch hypercall or simply an access-watch hypercall may be used. A read-watch hypercall requests that reads to a particular page be watched and an access-watch hypercall requests that either type of access (read, write, or execution) be monitored.

At step 604, GI extension 114 determines whether the VM 120 that made the hypercall is executing in integrity mode. If the VM 120 that made the hypercall is executing in integrity mode, then method 600 proceeds to step 608 and if the VM 120 that made the hypercall is not executing in integrity mode, then method 600 proceeds to step 606. At step 606, GI extension 114 does not execute the hypercall and instead performs a global alert action specified in the protection data 122, because the hypercall was not made from integrity mode. After step 606, method 600 ends.

At step 608, because GI extension 114 determines that the hypercall is made from integrity mode, GI extension 114 executes the hypercall to start or stop monitoring for writes to memory pages. For a hypercall that requests that GI extension 114 begin monitoring a particular memory page, GI extension 114 adds a new entry in protection data 122 that indicates a new memory page to be protected as well as what alert actions are to be performed upon determining that a write to that memory page has occurred. GI extension 114 also registers the memory page with a platform tracing service, which executes within VMM 112, and provides the actual memory tracing services. For a hypercall that requests that GI extension 114 stop monitoring a particular memory page, GI extension 114 removes the entry within protection data 122 that corresponds to the memory page for which monitoring is to be stopped. GI extension 114 also unregisters the memory page with the platform tracing service to stop monitoring writes to the memory page. The actions that are taken when a write to a protected memory page is detected are described in greater detail with respect to FIG. 7.

Figure 7:
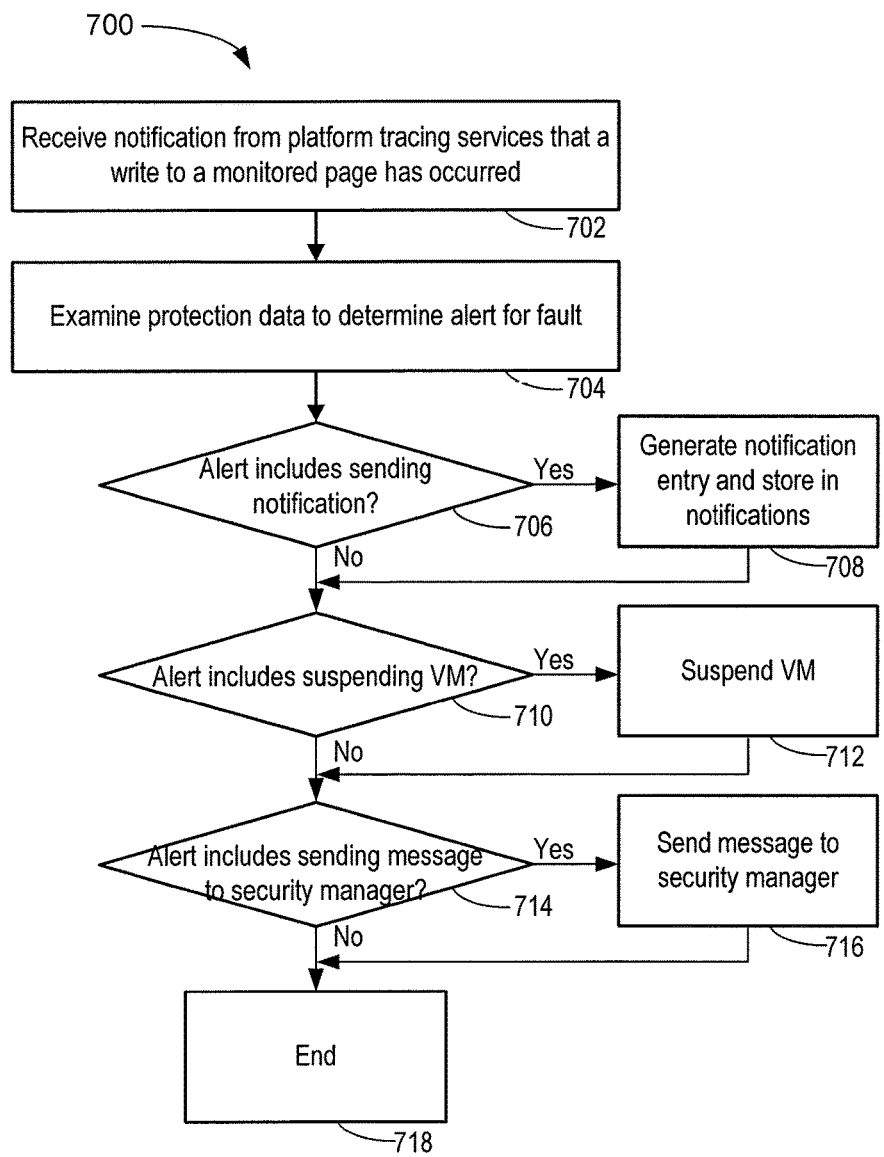
FIG. 7 is a flow diagram of a method for performing actions in response to a write occurring on a monitored memory page, according to an embodiment.

FIG. 7 is a flow diagram of a method 700 for performing actions in response to a write occurring on a monitored memory page, according to an embodiment. Although described with respect to the system of FIGS. 1 and 2, those of skill in the art will recognize that any system that performs the steps of method 700, in various alternative technically feasible orders, falls within the scope of the present disclosure.

As shown, a method 700 begins at step 702, where GI extension 114 receives a notification from platform tracing services that a write to a monitored memory page has occurred. More specifically, upon detecting a write to a memory page, the platform tracing service notifies GI extension 114 that such a write occurs. In some embodiments, the notification provided by the platform tracing service to the GI extension 114 is provided with some delay after the write actually occurs. In some embodiments, the platform tracing service does not prevent the write from occurring but instead detect such a write. In other embodiments, the platform tracing service does prevent the write from occurring.

Various mechanisms exist by which a platform tracing service may detect writes to a memory page. In one example, a processor of host 102 may provide functionality for detecting writes to memory pages registered with the platform tracing service and may notify the platform tracing service upon detecting writes to the registered memory pages. The platform tracing service simply registers one or more memory page with the processor in order to trigger such functionality. In another example, the platform tracing service sets a bit (hereinafter referred to as "protection bit") in the protected page's page table entry in the nested page tables 222 or in shadow page tables in embodiments where shadow page tables are used in place of nested page tables 222. In some embodiments, a fault handler is triggered when an access to a protected memory page occurs. The fault handler, included within the platform tracing service, performs steps such as notifying GI extension 114 that the write occurs, or the like. In some embodiments, such notifications occur with a certain amount of delay after the protected access occurs. When GI extension 114 receives a notification that a write occurs on a page for which the protection bit is set, the remaining steps of FIG. 7 are carried out to execute the predefined "alert" for that protected page. In a similar manner, a different (or the same bit) in the protected page's page table entry may be set to track read accesses and execution accesses to that page. Although certain examples of the manner in which tracing functionality can be implemented have been described, those of skill in the art will recognize that other implementations may alternatively be used.

At step 704, GI extension 114 examines protection data 122 to determine one or more alert actions that are to be performed in response to the memory page being written to. Protection data 122 stores indications of such alert actions on a per-page basis, so GI extension 114 determines the alert actions to be performed for the specific memory page that was written to.

At step 706, GI extension 114 determines whether the alert actions include sending a notification to GI driver 108. If the alert actions include sending a notification to GI driver 108, then method 700 proceeds to step 708, and if the alert actions do not include sending a notification to GI driver 108, then method proceeds to step 710. At step 708, GI extension 114 generates a notification entry and stores the notification entry in notification buffer 124 for consumption by GI driver 108. After step 708, method 700 proceeds to step 710.

At step 710, GI extension 114 determines whether the alert actions include suspending a VM. If the alert actions include suspending a VM, then method 700 proceeds to step 712 and if the alert actions do not include suspending a VM, then method 700 proceeds to step 714. At step 712, GI extension 114 suspends the specified VM. After step 712, method 700 proceeds to step 714.

At step 714, GI extension 114 determines whether the alert actions include sending a message to security manager 130. If the alert actions include sending such a message, then method 700 proceeds to step 716 and if the alert actions do not include sending such a message, then method 700 proceeds to step 718. At step 716, GI extension 114 sends a message to security manager 130. After step 716, method proceeds to step 718. At step 718, method 700 ends. Although some example alert actions have been described, other alert actions are possible. In one example, one alert action includes blocking the write.

During operation, GI driver 108 may need to communicate notifications to security manager 130. However, in the event that network drivers of guest OS 106 are compromised, GI driver 108 may not be able to use this "standard" mechanism for communication with security manager 130. Thus a "backdoor" mechanism is provided to allow GI driver 108 to communicate directly with security manager.

This backdoor mechanism is embodied as a hypercall that GI driver 108 may invoke only while executing in integrity mode and that is processed by GI extension 114. Upon detecting that this backdoor message hypercall is invoked, GI extension 114 determines whether the hypercall was made from within integrity mode. If the hypercall was not made from within integrity mode, then GI extension 114 does not execute the hypercall. GI extension 114 examines protection data 122 to determine what alert action is associated with attempting to execute protected hypercalls outside of integrity mode and performs that alert action.

If the backdoor message hypercall is made in integrity mode, then GI extension 114 executes that hypercall. The hypercall specifies an address within guest memory space 205 at which a message exists. GI extension 114 reads the message stored at that address and transmits the message to security manager 130 (FIG. 1). GI extension 114 may utilize networking resources of host 102 to transmit the message to security manager 130.

In addition to requesting that particular physical pages be watched, GI driver 108 may also invoke a hypercall to start watching or stop watching specific guest virtual to guest physical mappings within gPTs 210. The purpose of watching these mappings is to prevent circumvention of the memory page protections described herein by simply modifying the mappings in gPTs 210.

Hypercalls to watch gPT 210 mappings may only be executed in integrity mode. Such hypercalls include, as an argument, an identification of one or more mappings that are to be watched. GI extension 114 detects modifications to watched mappings each time integrity mode is entered. GI extension 114 may also detect modifications to watched mapping when GI driver 108 executes a hypercall that specifically requests GI extension 114 to detect whether modifications to watched mappings have occurred. This additional hypercall must be called in integrity mode. When GI extension 114 receives a hypercall to watch one or more gPT mappings, GI extension 114 records the one or more gPT mappings. Subsequently, when either integrity mode is entered or when the specific hypercall to check mappings is invoked, GI extension 114 checks the recorded mappings against the mappings actually stored in the guest page tables and performs an alert action specified in protection data 122 if GI extension 114 determines that a mapping has been altered.

Additional hypercalls exist for identifying, to GI extension 114, which memory location within protection data 122 is to be used for an alert table, and for defining alert actions in that alert table. These hypercalls must be executed in integrity mode. Defining alert actions involves defining global alert actions as well as defining entries in the alert table for non-global events. Global alert actions define specific alert actions that GI extension 114 takes responsive to particular "global" events occurring. Global alert actions are stored in protection data 122. Global events include detecting a hypercall made from outside of integrity mode, attempting to enter integrity mode from a point other than the properly set entry point, and other events that may be considered to be an "error." Non-global events are stored as entries in an alert table within protection data 122 that associate specific watched memory pages with specific alert actions to take when writes to those pages are detected. Actions that can be taken include writing a notification into notification buffer 124, sending a message to security manager 130, or suspending the VM.

Hypercalls also exist to initialize protection data 122 and initialize notification buffer 124. These hypercalls inform GI extension 114 which pages in guest memory space 205 store protection data 122 and notification buffer 124. In some embodiments, these hypercalls cause GI extension 114 to begin write-monitoring the memory pages storing the protection data 122 and notification buffer 124 (and thus GI driver 108 does not need to separately request write monitoring of these memory pages). These hypercalls can only be called from integrity mode. A hypercall also exists for informing GI extension 114 that an entry in notification buffer 124 has been consumed. This hypercall must be executed in integrity mode. Because notification buffer 124 is in guest memory space 205, GI driver 108 may access notification buffer 124 directly.

Often a mechanism is needed for a guest agent (e.g., a GI driver) to safely traverse guest data structures without support from or modifications to the guest kernel. The traversals are un-synchronized, but may happen while a different guest agent concurrently modifies those structures. Therefore, such traversals may normally trigger faults (such as page faults and general protection faults) or could change device state if the traversal includes a memory mapped I/O (mmio) access.

Embodiments described herein provide a technique that allows the guest agent to redirect execution to special error-handling code in the guest agent instead of triggering these faults or events. That is, in the normal case, a read of guest memory data structures occurs quickly and without having to handle any page faults or general protection faults.

Figure 8A:
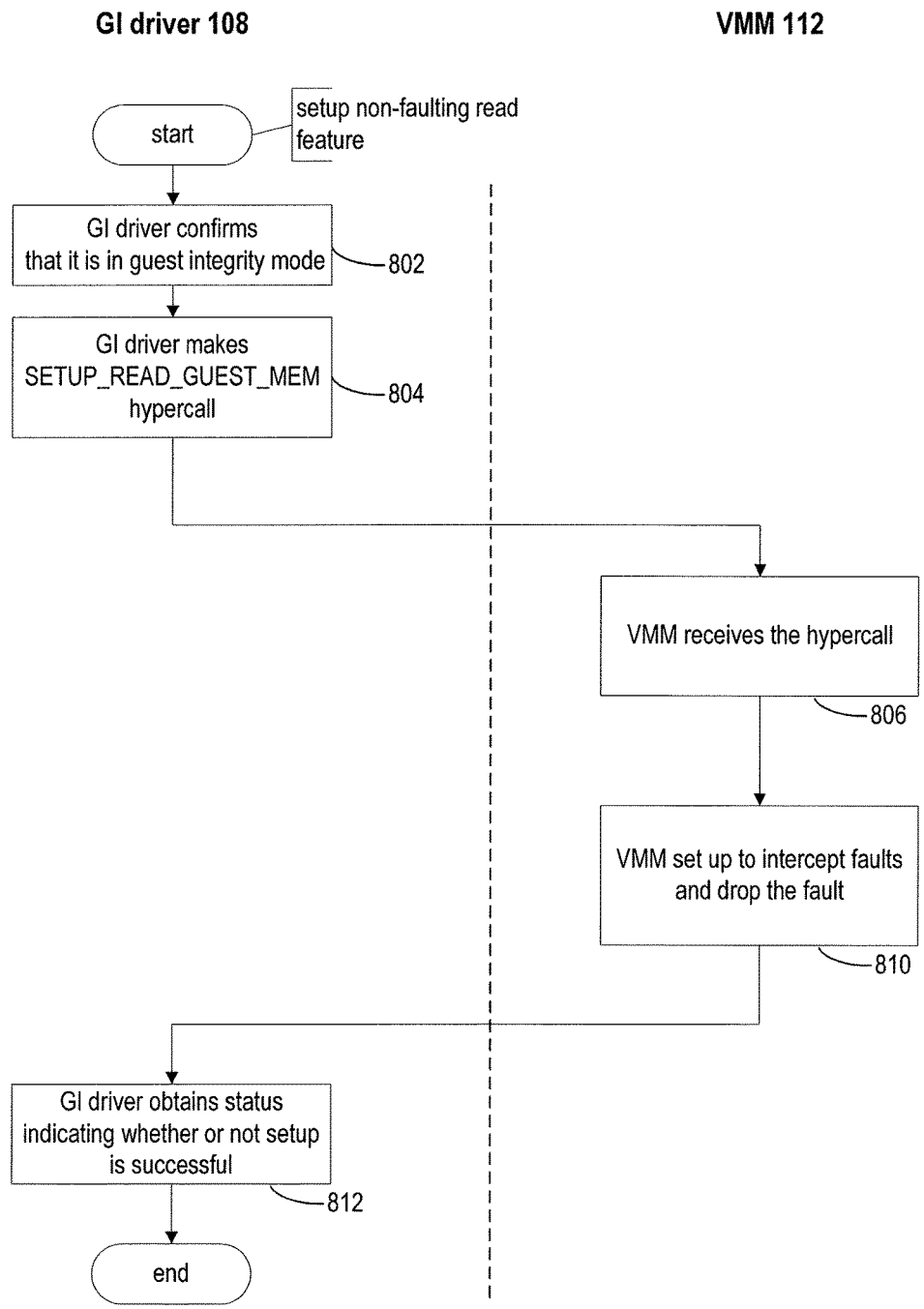
FIGS. 8A and 8B are flow diagrams of a method for setting up and performing a read operation on guest memory data structures, according to an embodiment.
Figure 8B:
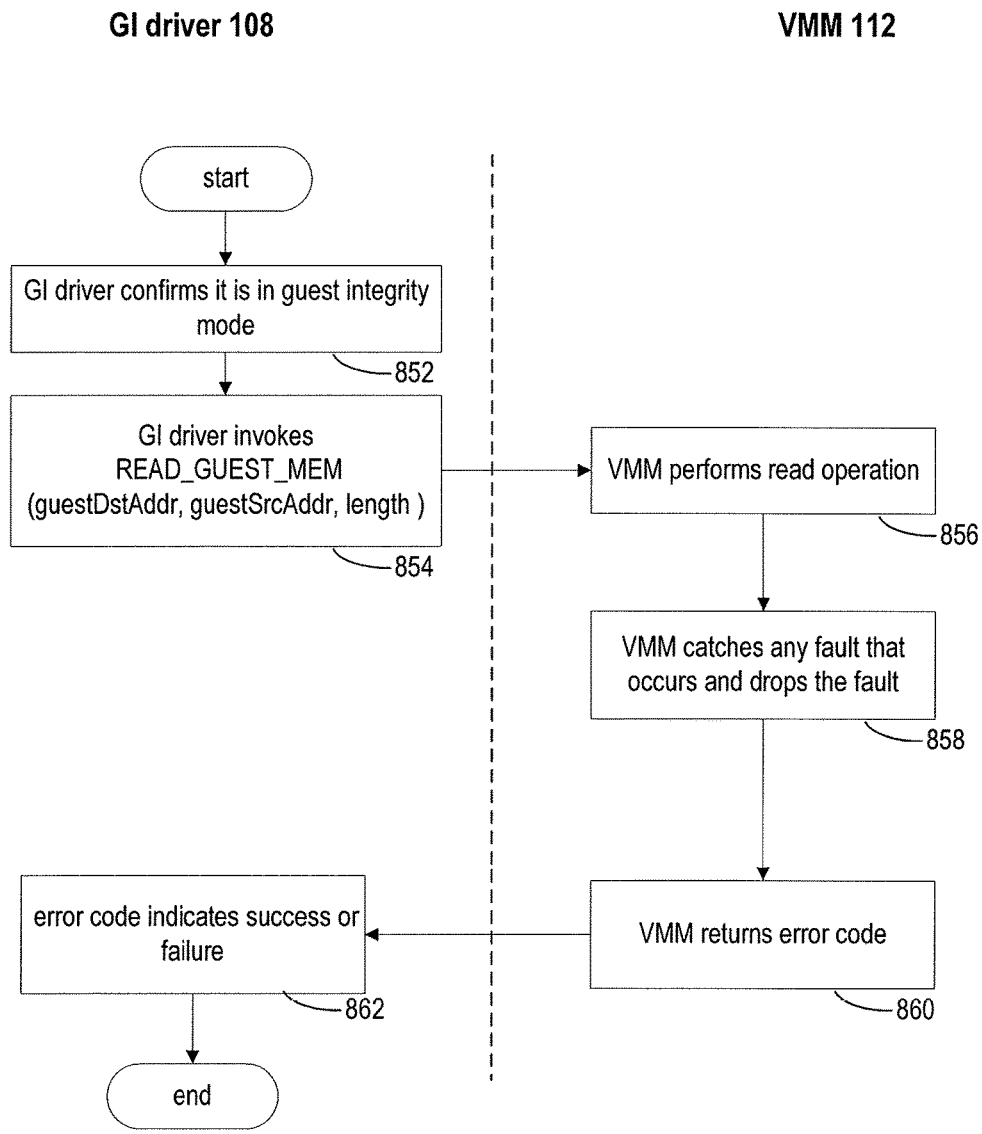

FIGS. 8A and 8B depict an embodiment of a read operation on guest memory data structures. In this embodiment, a function READ_GUEST_MEM is called and executed as depicted in FIG. 8B by the virtual machine monitor (VMM) for each memory read operation involved in a traversal of the guest memory data structures.

FIG. 8A depicts the steps for setting up the read operation on guest memory data structures according to this embodiment. In step 802, the GI driver confirms that it is in guest integrity mode. The rest of the steps of FIG. 8A are not executed unless the GI driver is in or enters the guest integrity mode. In step 804, the GI driver makes a hypercall (depicted as SETUP_READ_GUEST_MEM) to set up the VMM for the operation. In step 806, the VMM receives the hypercall. In step 810, the VMM, responsive to this hypercall, enters a mode of operation where it intercepts all page faults and general protection faults and drops them. In step 812, the GI driver obtains status from the VMM indicating whether or not the setup is successful.

FIG. 8B depicts the operation of this embodiment once the setup operation of FIG. 8A has been successfully carried out. In step 852, the GI driver confirms that it is in guest integrity mode. The rest of the steps of FIG. 8B are not executed unless the GI driver is in or enters the guest integrity mode. In step 854, the GI driver invokes a READ_GUEST_MEM function with the guest destination address (guestDstAddr), guest source address (guestSrcAddr) and length arguments. In step 856, the VMM performs the read operation in the form of a copy operation specified by the READ_GUEST_MEM function. In step 858, the VMM catches any page faults and general protection faults that occur during the performance of the function and drops them. In step 860, the VMM returns an error code to the GI driver indicating whether or not the read operation specified by the function succeeded. In step 862, the GI driver receives the error code reported by the VMM.

Figure 9A:
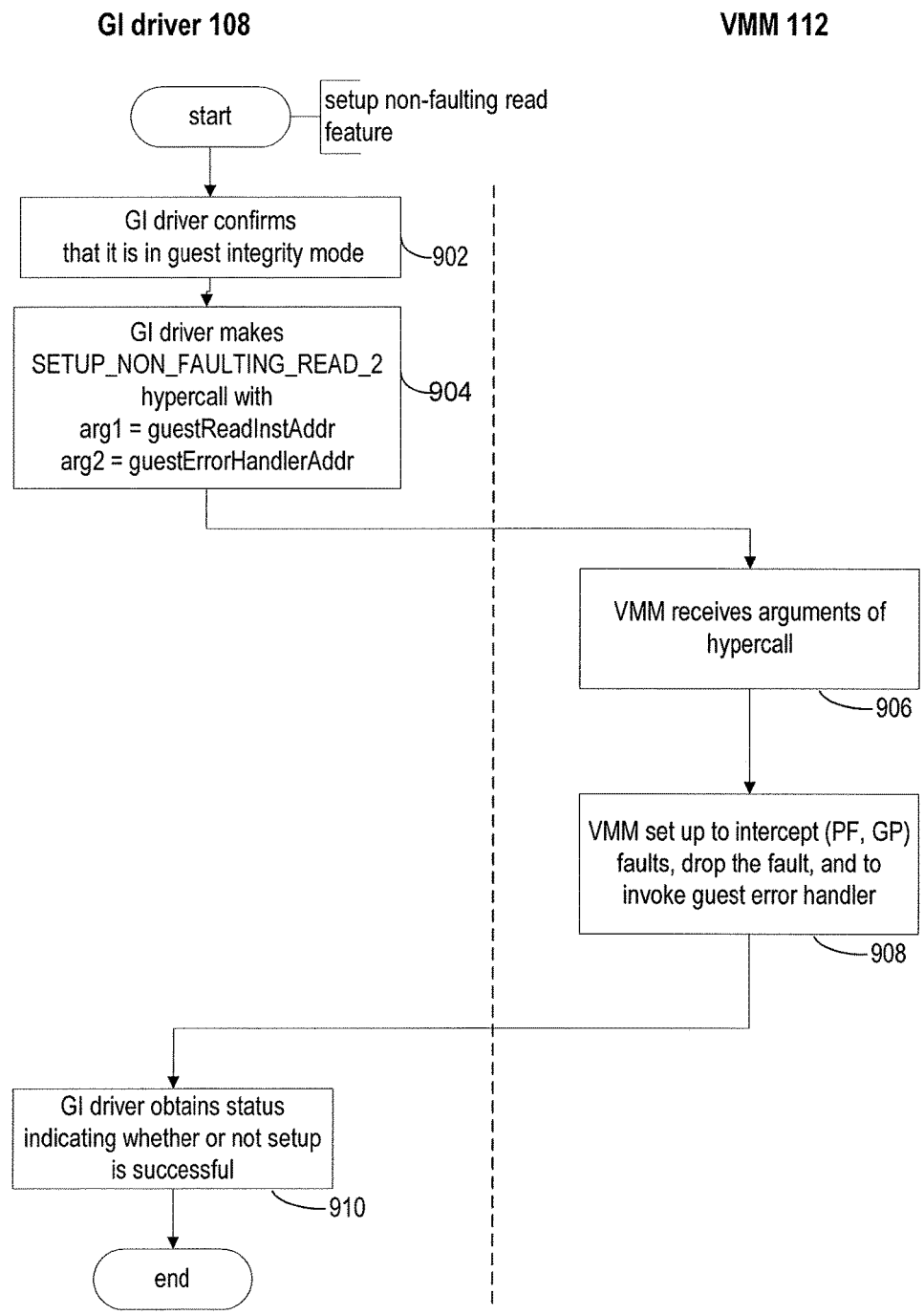
FIGS. 9A and 9B are flow diagrams of a method for setting up and performing a read operation on guest memory data structures, according to another embodiment.
Figure 9B:
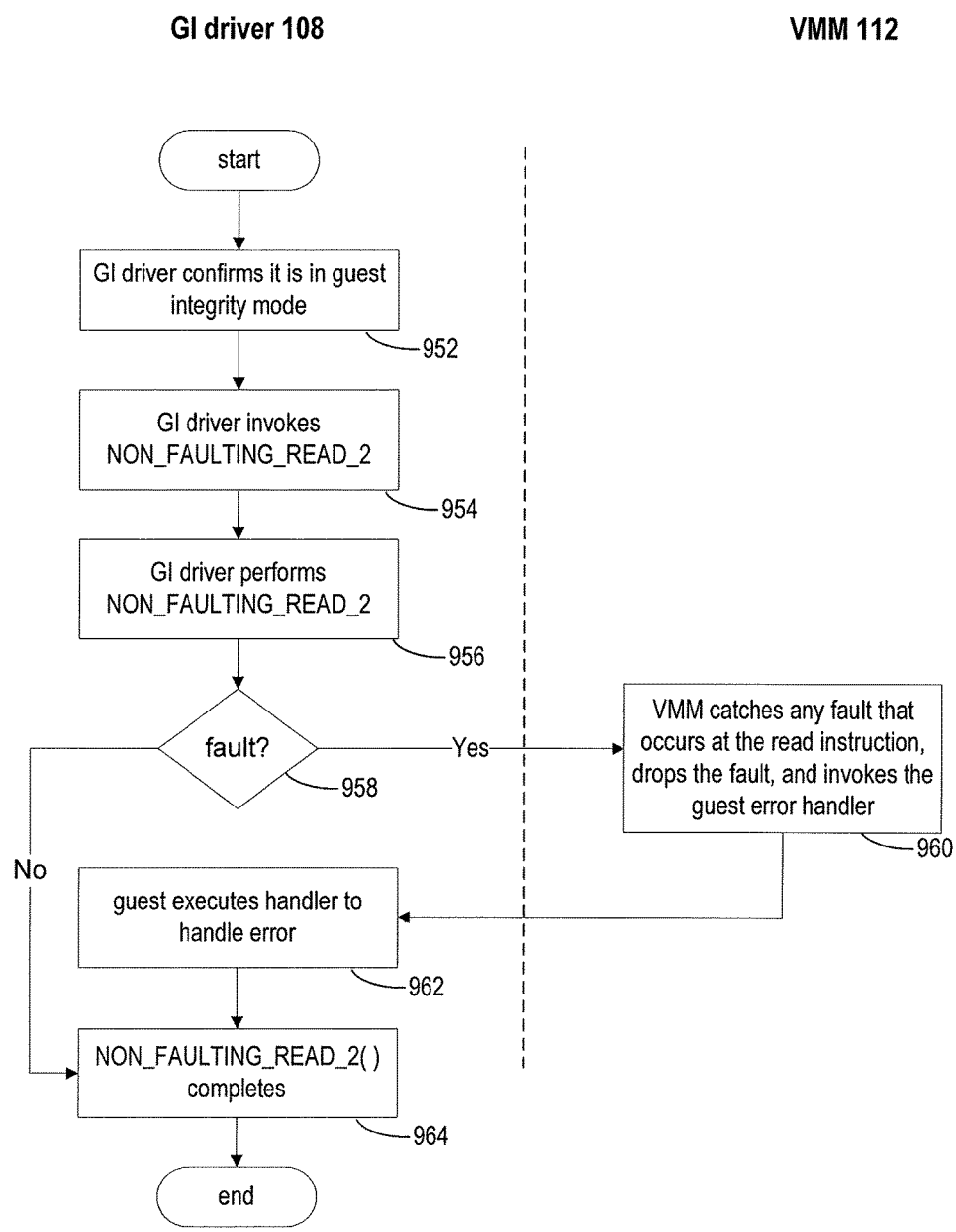

FIGS. 9A and 9B depict another embodiment of a read operation on guest memory data structures. In this embodiment, the GI driver sets up and executes a function NON_FAULTING_READ_2( ) to perform the read operation on guest memory data structures.

FIG. 9A depicts the steps for setting up the read operation on guest memory data structures according to this embodiment. In step 902, the GI driver confirms that it is in guest integrity mode. The rest of the steps of FIG. 9A are not executed unless the GI driver is in or enters the guest integrity mode. In step 904, the GI driver makes a hypercall (depicted as SETUP_NON_FAULTING_READ_2) with two arguments, guestReadInstAddr and guestErrorHandlerAddr. The first argument, guestReadInstAddr, specifies the address in guest memory of the read instruction and the second argument, guestErrorHandlerAddr, specifies the location of an error handling routine in the guest code for handling any errors that may occur during the read operation. In step 906, the VMM receives the arguments of the hypercall and in step 908, responsive to this hypercall, enters a mode of operation where it intercepts all page faults and general protection faults that occurs at the read instruction, guestReadInstAddr, drops them, and invokes the guest error handler. In step 910, the GI driver obtains status from the VMM indicating whether or not the setup was successful.

FIG. 9B depicts the operation of this embodiment once the setup operation of FIG. 9A has been successfully carried out. In step 952, the GI driver confirms it is guest integrity mode. The rest of the steps of FIG. 9B are not executed unless the GI driver is in or enters the guest integrity mode. In step 954, the GI driver invokes the NON_FAULTING_READ_2( ) function. In step 956, the GI performs the NON_FAULTING_READ_2( ) function. In step 958, if any page fault or general protection fault occurs at the read instruction, guestReadInstAddr, the VMM catches the fault, drops the fault, and invokes the guest error handler in step 960. In step 962, the guest code executes the guest error handler to handle an error reported by the VMM and the function completes in step 964. If no fault occurs during the read operations, then the function completes at step 964.

Figure 10A:
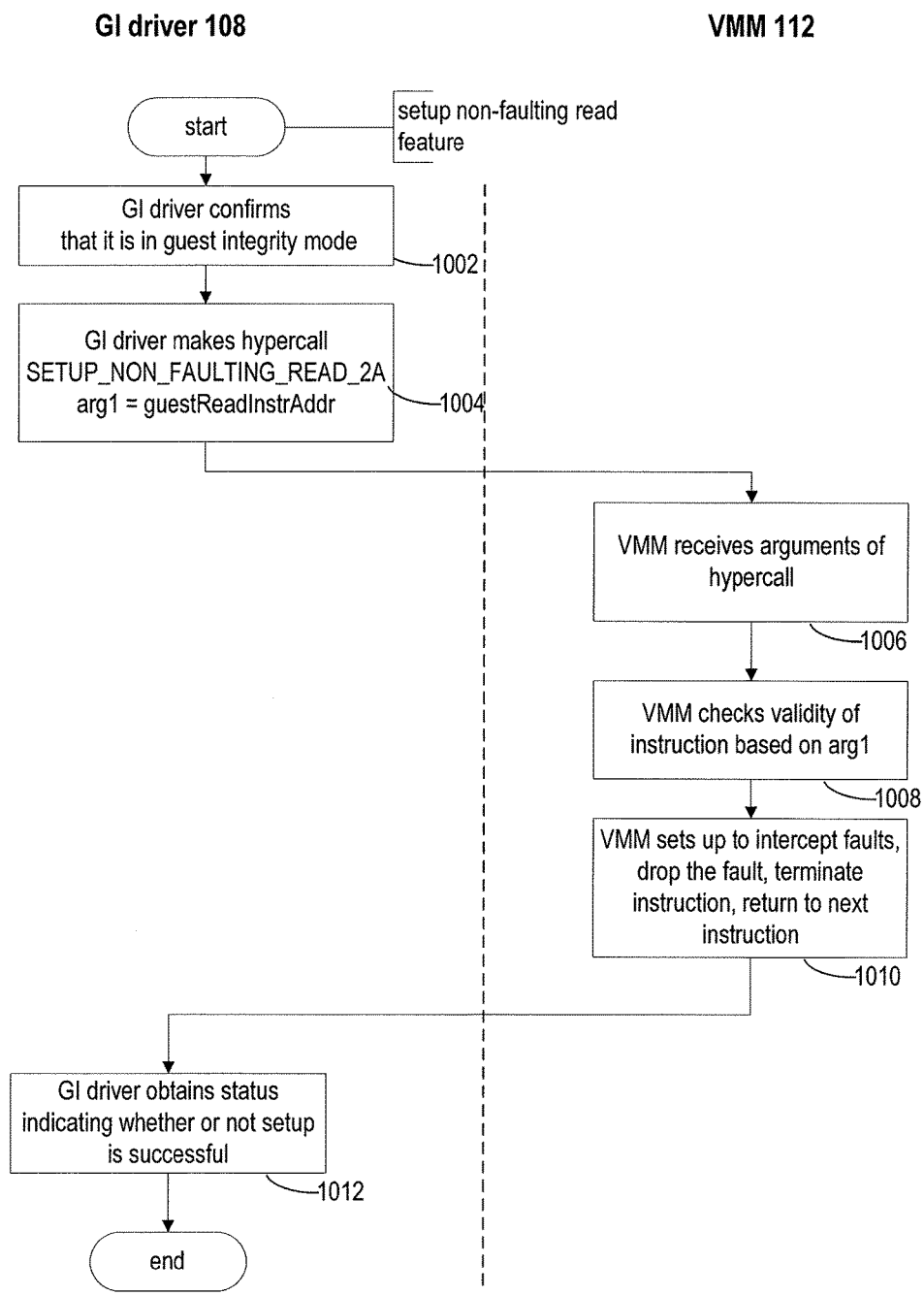
FIGS. 10A and 10B are flow diagrams of methods respectively for setting up and performing a read operation on guest memory data structures, according to another embodiment.
Figure 10B:
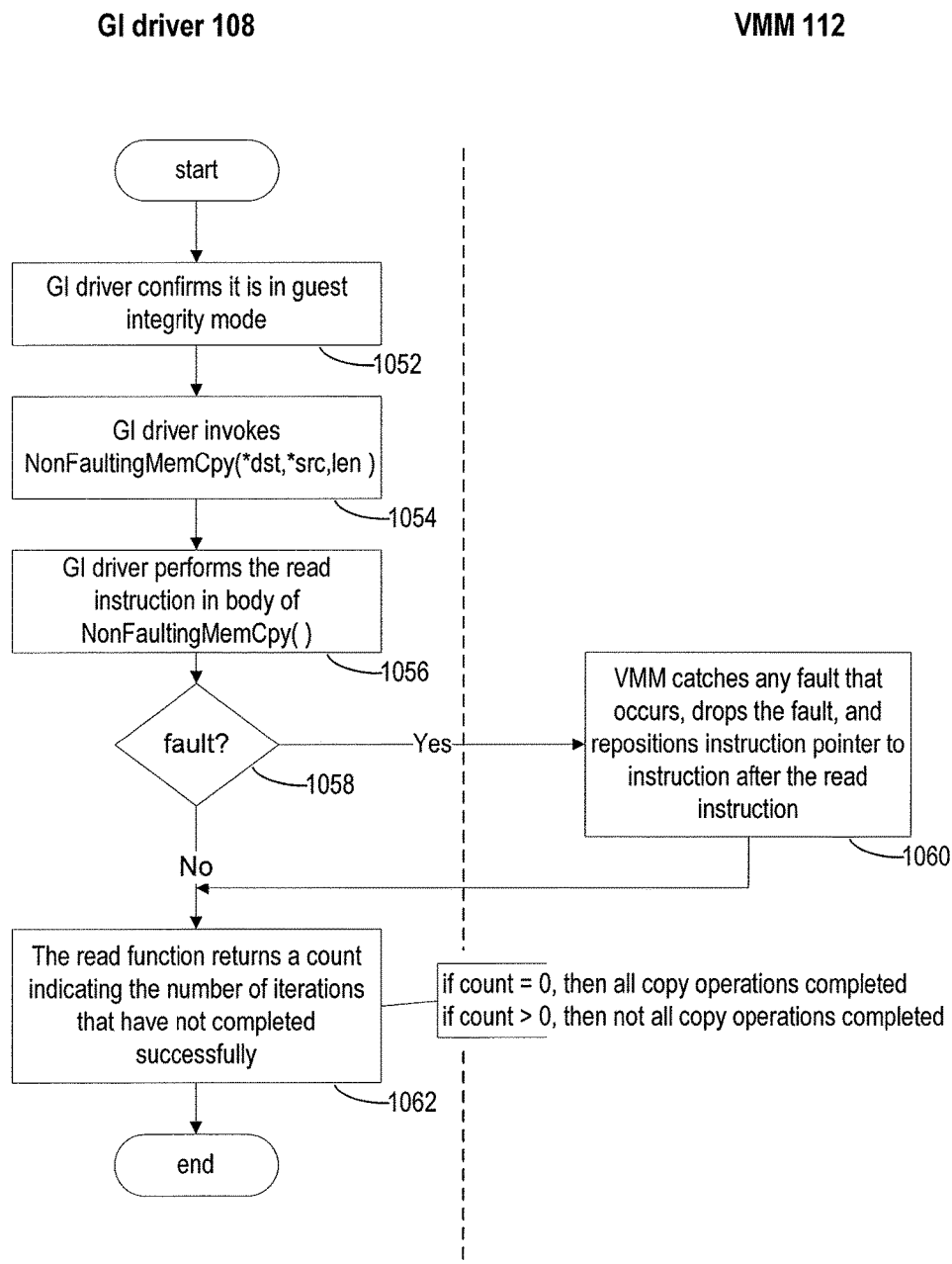

FIGS. 10A and 10B depict another embodiment of a read operation on guest memory data structures. In this embodiment, the GI driver sets up and executes a function NonFaultingMemCpy to perform the read operation on guest memory data structures.

FIG. 10A depicts the steps for setting up the read operation on guest memory data structures according to this embodiment. In step 1002, the GI driver confirms that it is in guest integrity mode. The rest of the steps of FIG. 10A are not executed unless the GI driver is in or enters the guest integrity mode. In step 1004, the GI driver makes a hypercall (depicted as SETUP_NON_FAULTING_READ_2A) with a single argument, guestReadInstAddr, which specifies the address of an instruction in the NonFaultingMemCpy function at which the read operation is to occur. In step 1006, the VMM receives the arguments of the hypercall. In step 1008, the VMM checks the validity of the read instruction based on the received argument. In step 1010, the VMM enters a mode of operation where it intercepts any page fault or general protection fault that occurs at the read instruction, drop the fault, terminate the instruction, and execute the instruction immediately following the read instruction, which returns status of the read instruction. In step 1012, the GI driver obtains the status from the VMM indicating whether or not the setup was successful.

FIG. 10B depicts the operation of this embodiment once the setup operation of FIG. 10A has been successfully carried out. In step 1052, the GI driver confirms it is in guest integrity mode. The rest of the steps of FIG. 10B are not executed unless the GI driver is in or enters the guest integrity mode. In step 1054, the GI driver invokes the function NonFaultingMemCopy( ) function. In step 1056, the GI driver executes the read instruction that was prepared by the function in step 1054. If a fault occurs during the execution of the read instruction, then in step 1060, the VMM caches the fault, drops the fault, and repositions the instruction pointer to the next instruction after the read instruction. In step 1062, the read function completes and returns a count indicating the number of iterations that have not completed successfully. A count of zero indicates that all of the read operations completed successfully. A count greater than zero, indicates the number of read operations that did not complete.

In one version of this embodiment, x86 assembly code is used to implement the NonFaultingMemCpy function. The guest read operation is performed by the "rep movsb" instruction (which is a copy operation) whose address is received by the VMM 112 at step 1006 in FIG. 10A. The call to the function passes input parameters (*dst, *src, len), which are respectively the destination address, the source address and the length of the read operation, in the (edi, esi, edx) registers and returns the count value in the eax register. The input parameters and the code example follow the GNU compiler (gcc) x64 application binary interface (ABI) calling conventions.

TABLE 1

| Line # | Label | Instruction | Comment |
|--------|-------|-------------|---------|
| 1 | NonFaultingMemCpy: | mov %edx, %ecx | //set counter = #data items |
| 2 | | cld | //clear direction flag - causes edi //and esi to increment |
| 3 | MemCpyReadRip: | rep movsb | //uses esi as source and edi as //destination |
| 4 | | mov %ecx, %eax | //report count value |
| 5 | | ret | |

In Table 1, line 1, the edx register is moved into the ecx register. The edx register contains the length of the copy (number of memory data items to be copy) and the ecx register operates as a "down" counter during the copy. In line 2, the "cld" instruction is executed, which clears the direction flag and causes the addresses in edi and esi to increment during the copy. In line 3, a repeat move string byte instruction (rep movsb) executes to transfer memory data items at the source address, which is contained in the esi register to the destination address, which is contained in the edi register. If the move string byte instruction in line 3 stops due to an error, the move instruction in line 4 moves the contents of the counter, ecx, into the eax register. In line 5, the call returns with the counter value in the eax register.

In another embodiment, special semantics of a repeat string instruction are provided by a given instruction prefix in the NonFaultingMemCopy function and no hypercall is needed to set up the special behavior, as the hardware provides the needed functionality.

Figure 11A:
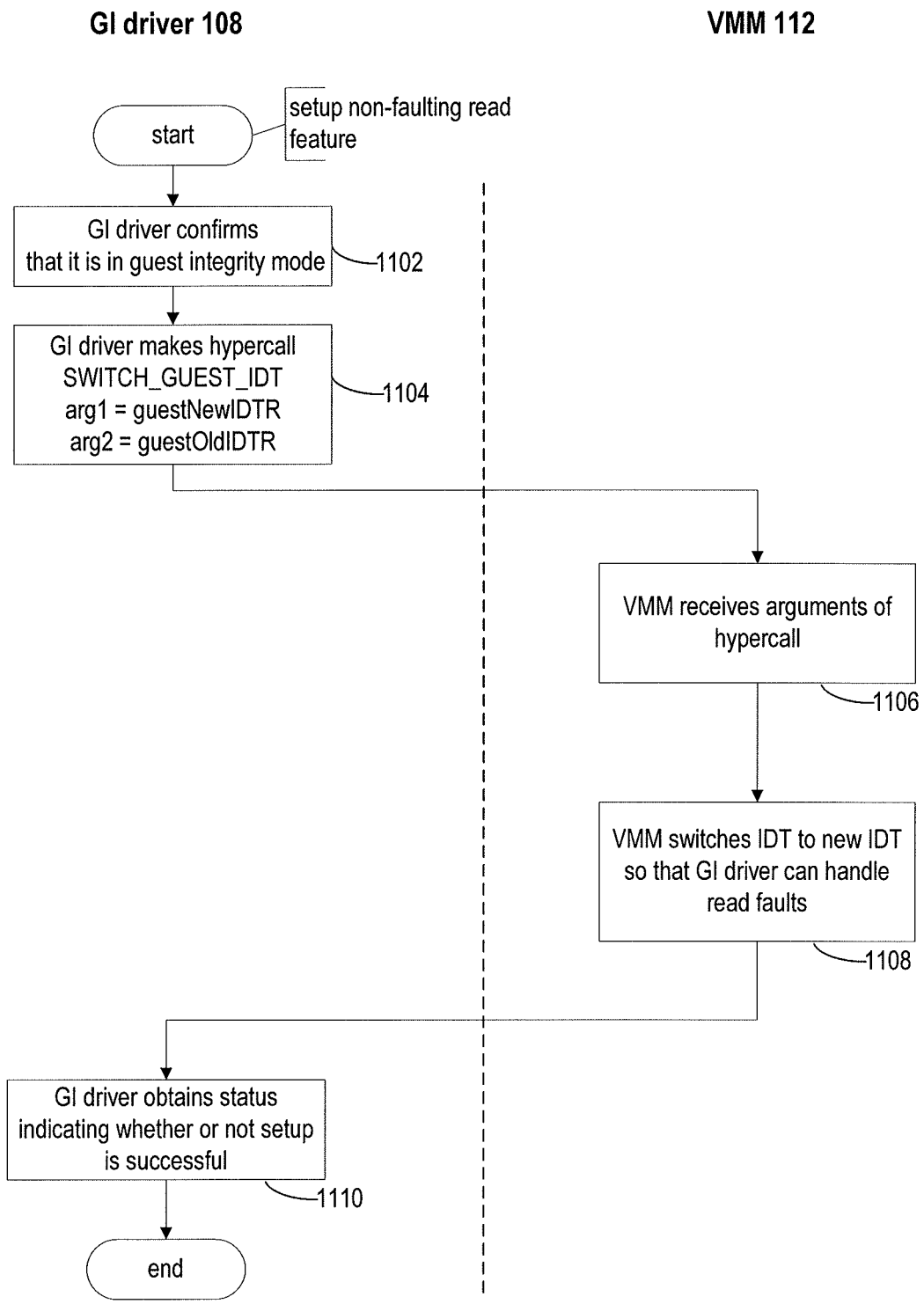
FIGS. 11A and 11B are flow diagrams of methods respectively for setting up and performing a read operation on guest memory data structures, according to another embodiment.
Figure 11B:
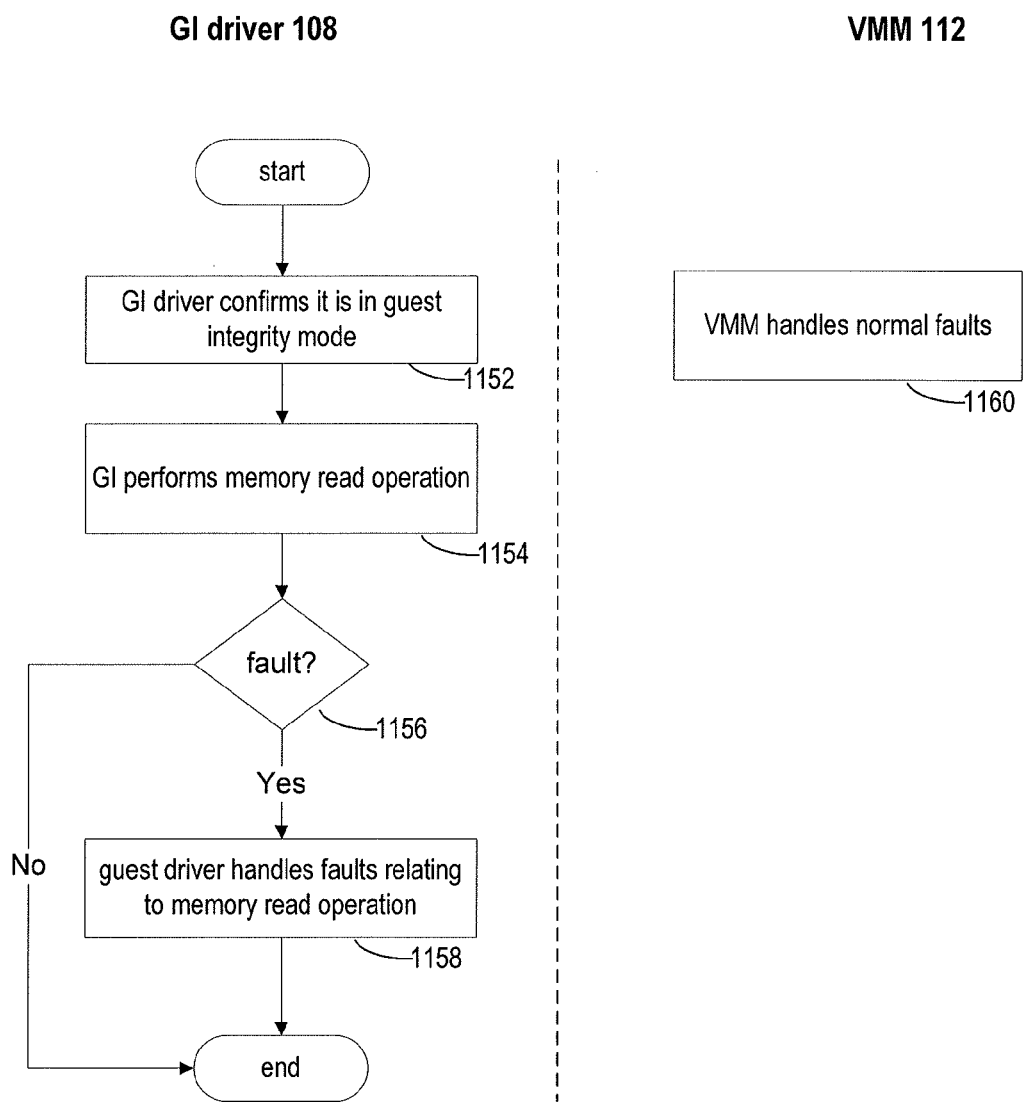

FIGS. 11A and 11B depict another embodiment of a read operation on guest memory data structures. In this embodiment, which is specific to x86 architectures, the GI driver switches the x86 interrupt descriptor table (IDT) to a different IDT table, which is set up to provide page faults and general protection faults related to the read operation directly to the guest driver during the execution of the read operation.

FIG. 11A depicts the steps for setting up this embodiment. In step 1102, the GI driver confirms that it is in guest integrity mode. The rest of the steps of FIG. 11A are not executed unless the GI driver is in or enters the guest integrity mode. In step 1104, the GI driver makes a hypercall (depicted as SWITCH_GUEST_IDT) with two arguments, guestNewIDTR and guestOldIDTR, which respectively provide a value in the IDTR register pointing to the new IDT and a value in the IDTR register pointing to the old IDT. In step 1106, the VMM receives the arguments of the hypercall, and in step 1108, switches the IDT to the new IDT so that the GI driver can handle faults during the read operation. In step 1110, the GI driver obtains status from the VMM indicating whether or not the setup was successful.

FIG. 11B depicts the operation of this embodiment once the setup operation of FIG. 11A has been successfully carried out. In step 1152, the GI driver confirms that it is in guest integrity mode. The rest of the steps of FIG. 11B are not executed unless the GI driver is in or enters the guest integrity mode. In step 1154, the GI driver performs the memory read operation. In step 1158, in accordance with the switch of the IDT table, the GI driver handles any page fault or general protection fault related to the read operation if any should occur during the memory read operation, as determined in step 1156. In step 1160, the VMM handles any other faults.

Figure 12A:
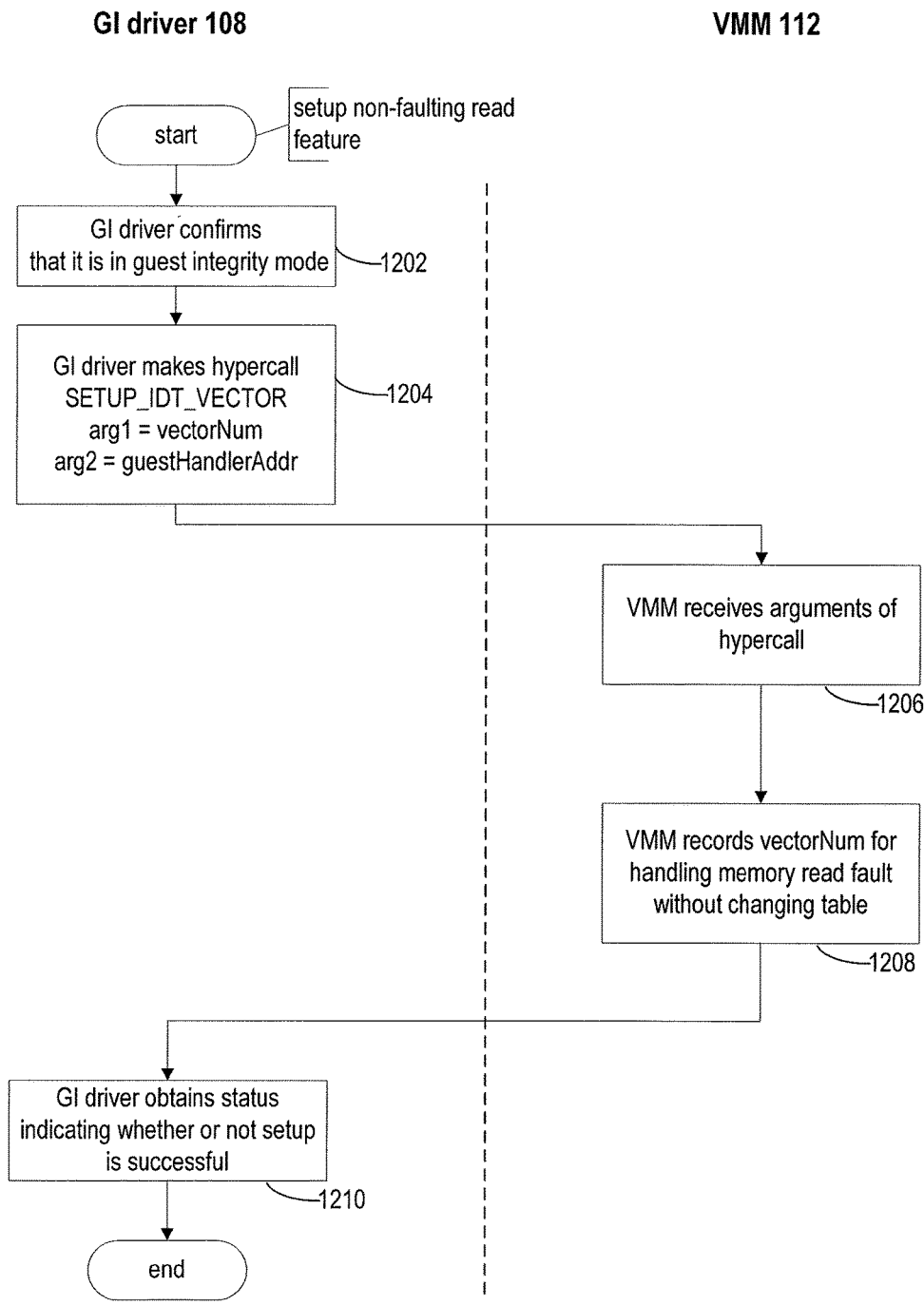
FIGS. 12A and 12B are flow diagrams of methods respectively for setting up and performing a read operation on guest memory data structures, according to another embodiment.
Figure 12B:
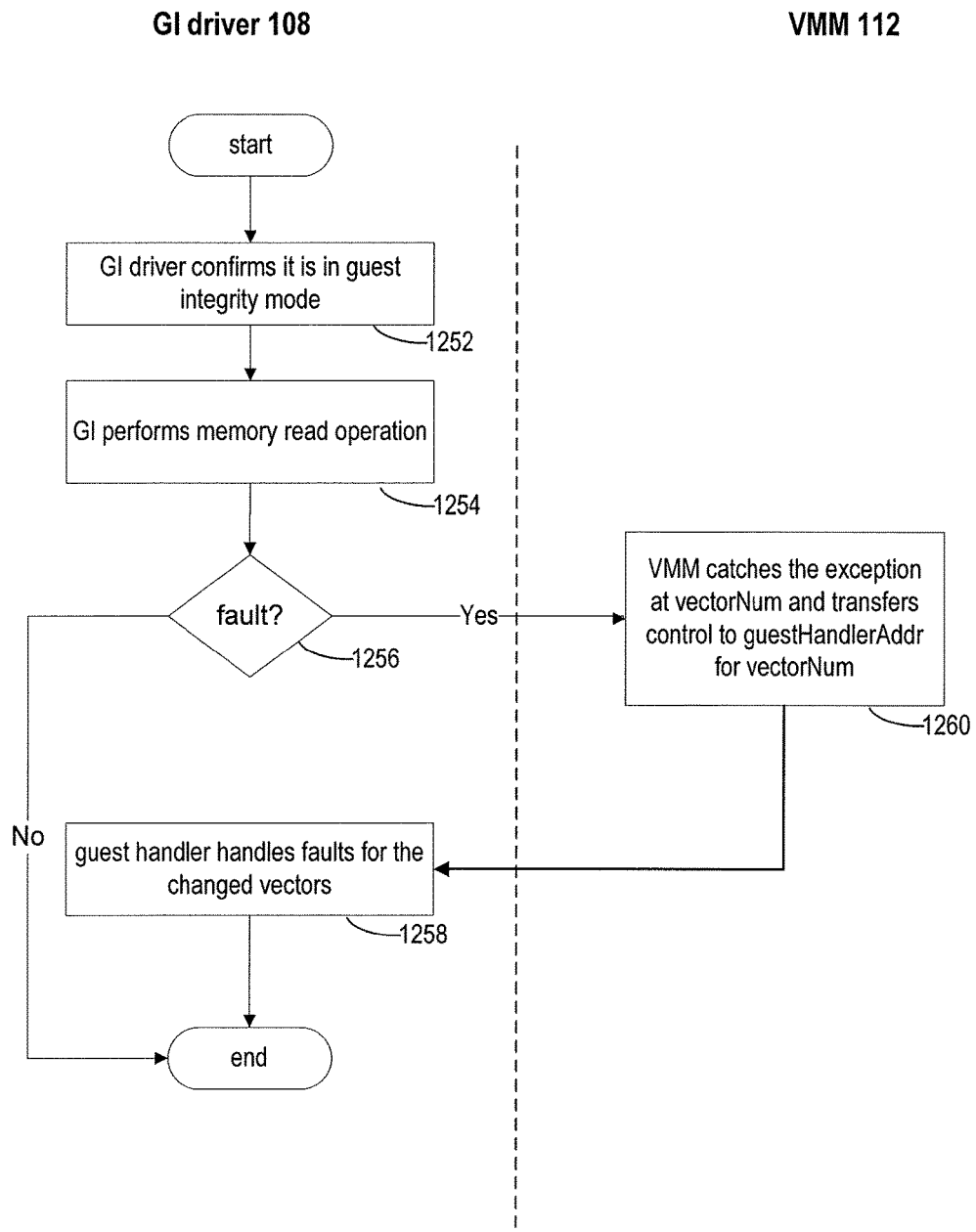

FIGS. 12A and 12B depict another embodiment of a read operation on guest memory data structures. In this embodiment, the GI driver requests that exception handling addresses in the IDT be altered so that a predefined guest handler can be invoked to handle faults related to the memory read operation.

FIG. 12A depicts the steps for setting up this embodiment. In step 1202, the GI driver confirms that it is in guest integrity mode. The rest of the steps of FIG. 12A are not executed unless the GI driver is in or enters the guest integrity mode. In step 1204, the GI driver makes a hypercall (depicted as SETUP_IDT_VECTOR) with two arguments, vectorNum and guestHandlerAddr, which respectively provide (i) the vector number at which the exception handling address for the predefined guest handler will be stored in the IDT, and (ii) the exception handling address for the predefined guest handler. In step 1206, the VMM receives the arguments of the hypercall and in step 1208 records the vectorNum (a pointer to an entry in the IDT) for handling a memory read fault, without modifying the IDT. In step 1210, the GI driver obtains status from the VMM indicating whether or not the step is successful.

FIG. 12B depicts the operation of this embodiment once the setup operation of FIG. 12A has been successfully carried out. In step 1252, the GI driver confirms that it is in guest integrity mode. The rest of the steps of FIG. 12B are not executed unless the GI driver is in or enters the guest integrity mode. In step 1254, the GI driver performs the memory read operation and if a page fault or general protection fault occurs pertaining to the read operation during the operation as determined in step 1256, the VMM catches the interrupt (the page fault or general protection fault) at step 1260 and emulates the delivery of the interrupt by transferring control to the guestHandlerAddr, so that a guest handler can handle the interrupt at step 1258.

Figure 13A:
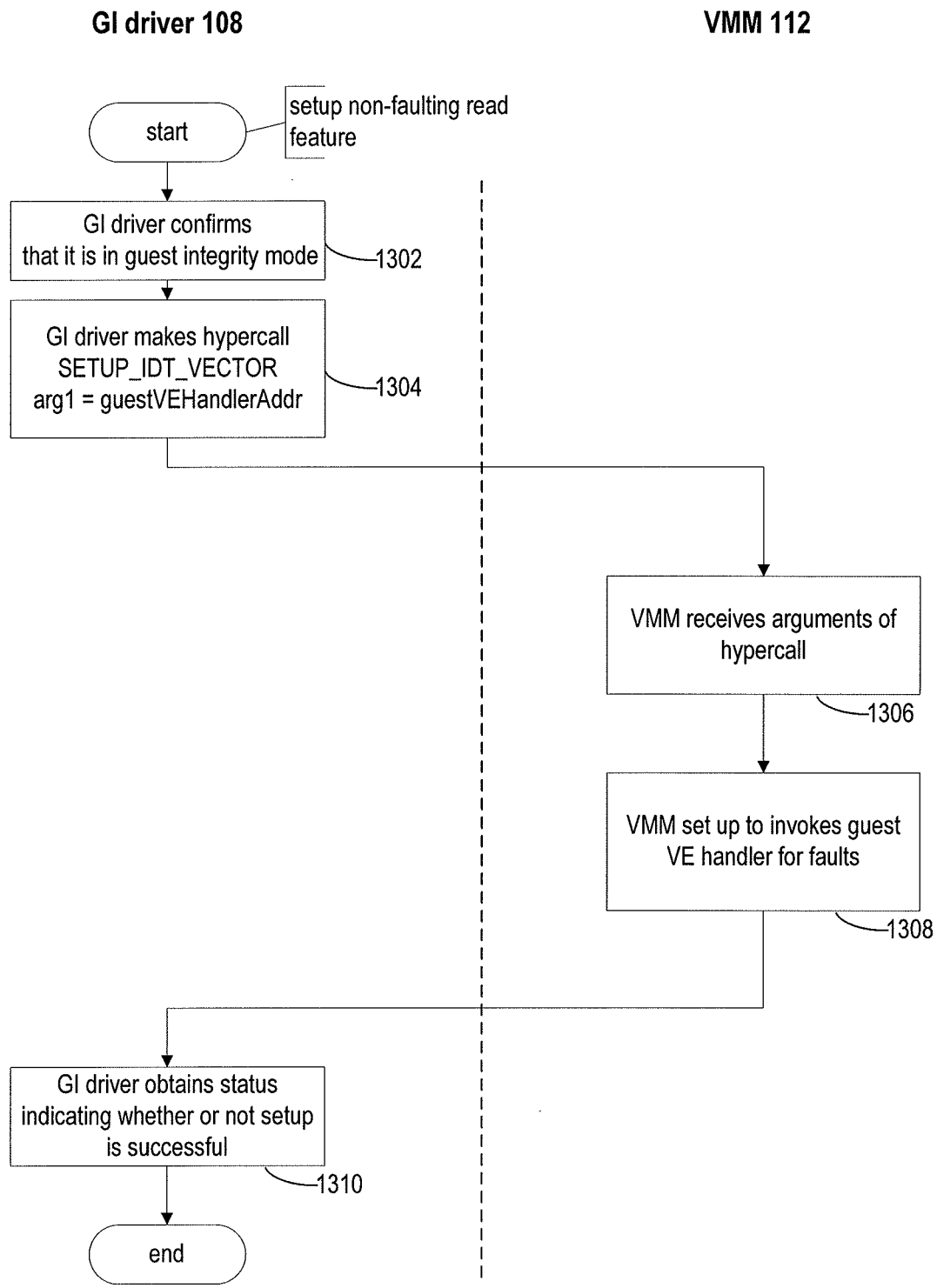
FIGS. 13A and 13B are flow diagrams of methods respectively for setting up and performing a read operation on guest memory data structures, according to another embodiment.
Figure 13B:
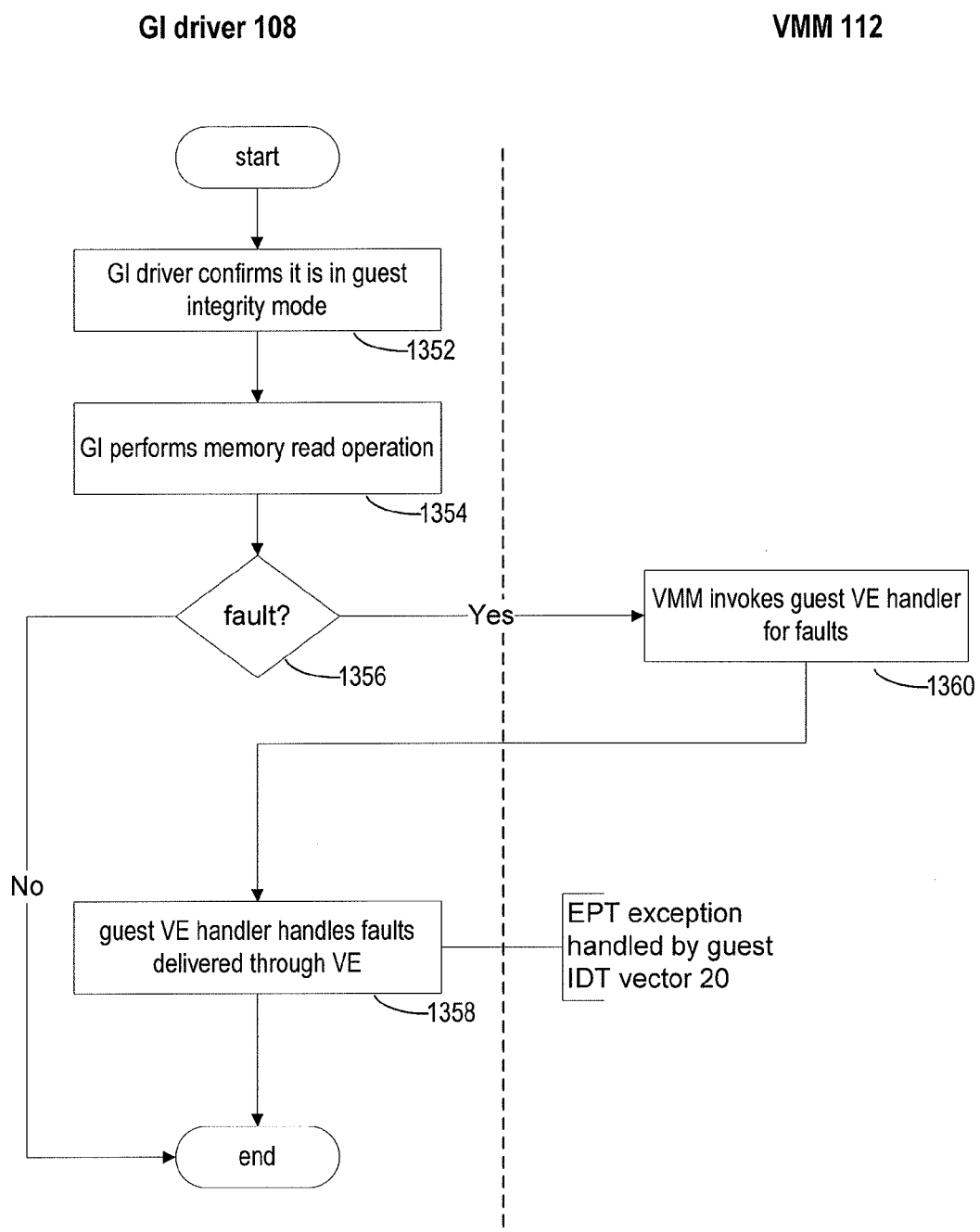

FIGS. 13A and 13B depict another embodiment of a read operation on guest memory data structures. In this embodiment, the GI driver makes a hypercall (depicted as SETUP_IDT_VECTOR) with an argument guestVEHandlerAddr, which specifies a virtualization exception (VE) handler for a fault relating to a memory read operation. The GI driver at the guestVEHandler address then handles any page faults and general protection faults pertaining to the read operation as a VE fault.

FIG. 13A depicts the operation of this embodiment once the setup operation of FIG. 13A has been successfully carried out. In step 1302, the GI driver confirms that it is in guest integrity mode. The rest of the steps of FIG. 13A are not executed unless the GI driver is in or enters the guest integrity mode. In step 1304, the GI driver makes the hypercall SETUP_IDT_VECTOR with the argument guestVEHandlerAddr which provides the handler address for a fault pertaining to the read operation. In step 1306, the VMM receives the argument of the hypercall and sets up to invoke the guest VE handler for faults pertaining to the read operation. In step 1310, the GI driver obtains status from the VMM indicating whether or not the setup is successful.

FIG. 13B depicts the operation of this embodiment. In step 1352, the GI driver confirms that it is in guest integrity mode. The rest of the steps of FIG. 13B are not executed unless the GI driver is in or enters the guest integrity mode. In step 1354, the GI performs the memory read operation. In step 1360, if there is a page fault or general protection fault pertaining to the memory read operation as determined in step 1356, the VMM catches the fault and invokes the guest VE handler. In step 1358, the guest VE handler handles any fault pertaining to the memory read.

Thus, the above techniques for reading guest memory data structures do not require guest OS support for structured exception handling (e.g., try-catch blocks), do not require knowledge about or access to the synchronization mechanisms for the guest data structure being traversed, and do not require modification of the guest exception handler routines or the guest interrupt descriptor table for events unrelated to the traversals.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. In a computer system having virtualization software that supports execution of guest virtual machines, a method of supporting first and second read operations performed on a portion of guest memory, comprising:
   upon detecting a fault caused by the first read operation while the virtualization software and a guest driver are in a first mode, the first read operation being carried out by the guest driver accessing said portion of guest memory, invoking a first fault handler to process the fault in the virtualization software, and terminating the first read operation; and
   upon detecting a fault caused by the second read operation while the virtualization software and the guest driver are in a second mode, the second mode being established as a result of the guest driver calling into the virtualization software and the second read operation being carried out by the guest driver accessing said portion of guest memory, processing the fault by the guest driver in the guest software without invoking the first fault handler, and terminating the second read operation.

2. The method of claim 1, wherein the guest driver processes an error code to indicate the fault caused by the second read operation.

3. The method of claim 1, wherein the guest driver includes a guest error handler to process the fault.

4. The method of claim 1, wherein the second read operation is performed by a repeat move string instruction.

5. The method of claim 4, wherein terminating the second read operation includes causing a count to be reported, the guest driver processing the count to determine a number of iterations of the second read operation that did not complete.

6. The method of claim 1, wherein the guest driver includes a second fault handler that is triggered by the fault caused by the second read operation.

7. The method of claim 6, wherein
   for the first read operation, a first interrupt descriptor table is used to determine an address of the first fault handler; and
   for the second read operation, a second interrupt descriptor table replaces the first interrupt descriptor table and is used to determine an address of the second fault handler.

8. The method of claim 6, wherein
   for the first read operation, an entry of a first interrupt descriptor table stores an address of the first fault handler; and
   for the second read operation, a pointer for an entry of the first interrupt descriptor table is associated with an address of the second fault handler.

9. The method of claim 1, wherein the guest driver includes a second fault handler that is invoked by a virtualization exception triggered by the fault caused by the second read operation.

10. A non-transitory computer-readable medium storing instructions which, when executed by a processor, cause the processor to perform, in a computer system having virtualization software that supports execution of guest virtual machines, a method of supporting one or more first read operations and second read operation performed on a portion of guest memory, the method comprising:
    upon detecting a fault caused by the one or more first read operations while the virtualization software and a guest driver are in a first mode, the one or more first read operations being carried out by the guest driver accessing said portion of guest memory, invoking a first fault handler to process the fault in the virtualization software and terminating the one or more first read operations; and
    upon detecting a fault caused by the second read operation while the virtualization software and the guest drive are in a second mode, the second mode being established as a result of the guest driver calling into the virtualization software and the second read operation being carried out by the guest driver accessing said portion of guest memory, processing the fault by the guest driver in the guest software without invoking the first fault handler, and terminating the second read operation.

11. The non-transitory computer-readable medium of claim 10, wherein the guest driver includes a guest error handler to process the fault.

12. The non-transitory computer-readable medium of claim 10, wherein the second read operation is performed by a repeat move string instruction.

13. The non-transitory computer-readable medium of claim 12, wherein terminating the second read operation includes causing a count to be reported, the guest driver processing the count to determine a number of iterations of the second read operation that did not complete.

14. The non-transitory computer-readable medium of claim 10, wherein the guest driver includes a second fault handler that is triggered by the fault caused by the second read operation.

15. The non-transitory computer-readable medium of claim 10, wherein the guest driver includes a second fault handler is invoked by a virtualization exception triggered by the fault caused by the second read operation.

16. A system comprising:
    a processor of a host computer system; and
    a memory of the host computer system,
    wherein the processor is coupled to the memory to execute virtualization software loaded into the memory, the virtualization software supporting execution of guest virtual machines,
    wherein at least one guest virtual machine supports a guest operating system that contains a guest driver, and
    wherein the guest driver and the virtualization software are configured to support a first read operation and a second read operation performed on a portion of guest memory by:
    invoking a first fault handler and terminating the first read operation, upon detecting a fault caused by the first read operation while the virtualization software and the guest driver are in a first mode, the first read operation being carried out by the guest driver accessing said portion of guest memory; and processing the fault by the guest driver in the guest software without invoking the first fault handler, and terminating the second read operation, upon detecting a fault caused by the second read operation while the virtualization software and the guest driver are in a second mode, the second mode being established as a result of the guest driver calling into the virtualization software and the second read operation being carried out by the guest driver accessing said portion of guest memory.

17. The system of claim 16, wherein the second read operation is performed by a repeat move string instruction.

18. The system of claim 17, wherein terminating the second read operation includes causing a count to be reported, the guest driver processing the count to determine a number of iterations of the second read operations that did not complete.

19. The system of claim 16, wherein the guest driver includes a second fault handler that is triggered by the fault caused by the second read operation.

20. The system of claim 16, wherein the guest driver includes a second fault handler that is invoked by a virtualization exception triggered by the fault caused by the second read operation.

* * * * *